US012654836B1

(12) United States Patent
    Casillas

(10) Patent No.: US 12,654,836 B1
(45) Date of Patent: Jun. 16, 2026

(54) CLOSEOUT SEAL FOR AIRCRAFT CABIN ASSEMBLY AND METHOD

(71) Applicant: The Boeing Company, Arlington, VA (US)

(72) Inventor: Jose Yuri Casillas, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/032,658

(22) Filed: Jan. 21, 2025

(51) Int. Cl.
    *B64C 1/14* (2006.01)

(52) U.S. Cl.
    CPC ...................................... *B64C 1/14* (2013.01)

(58) Field of Classification Search
    CPC .................................. F16J 15/027; B64C 1/14
    See application file for complete search history.

(56) References Cited

U.S. PATENT DOCUMENTS

| | | | | |
|---|---|---|---|---|
| 3,122,376 | A | * | 2/1964 | Atherholt, Sr. ....... B23B 31/305 |
| | | | | 277/645 |
| 3,308,727 | A | * | 3/1967 | Hurt, Jr. .................. E02D 29/14 |
| | | | | 277/645 |
| 3,778,176 | A | | 12/1973 | Pax |
| 4,676,531 | A | * | 6/1987 | Martin .................... F16L 17/10 |
| | | | | 285/97 |
| 4,741,542 | A | | 5/1988 | Kimerly |
| 4,860,495 | A | * | 8/1989 | Kessler .................... B60J 10/24 |
| | | | | 49/489.1 |
| 5,240,263 | A | * | 8/1993 | Nicholson ............ F16J 15/0893 |
| | | | | 219/137 R |
| 5,533,736 | A | * | 7/1996 | Yamaga .................. F16J 15/128 |
| | | | | 219/390 |
| 5,868,524 | A | * | 2/1999 | Martin .................... F16L 37/62 |
| | | | | 285/97 |
| 11,754,185 | B1 | | 9/2023 | Whitlow et al. |
| 12,129,012 | B2 | | 10/2024 | Casillas |
| 2006/0108747 | A1 | | 5/2006 | Kesseg |
| 2008/0164373 | A1 | * | 7/2008 | Roming .................... B64C 1/14 |
| | | | | 244/129.5 |
| 2011/0037228 | A1 | | 2/2011 | Thomas, Jr. et al. |
| 2011/0133027 | A1 | | 6/2011 | Graeber et al. |
| 2015/0076856 | A1 | | 3/2015 | Masumoto |
| 2018/0016008 | A1 | | 1/2018 | Payne et al. |
| 2020/0130806 | A1 | | 4/2020 | Heeren |
| 2022/0411068 | A1 | | 12/2022 | Weng et al. |

FOREIGN PATENT DOCUMENTS

| | | |
|---|---|---|
| DE | 202005019332 U1 | 2/2006 |
| EP | 0794079 A1 | 9/1997 |
| EP | 0873897 A1 | 10/1998 |
| EP | 4406836 A1 | 7/2024 |
| WO | 2020049295 A1 | 3/2020 |

* cited by examiner

*Primary Examiner* — Vishal A Patel
(74) *Attorney, Agent, or Firm* — COATS & BENNETT, PLLC

(57) ABSTRACT

Resilient elongated tubular seals that are flexible and that can absorb compressive forces and compress to seal gaps between adjacently positioned aircraft cabin structures and that can further expand outwardly from a compressed condition as compressive forces change or abate and methods of installation of such elongated tubular seals are disclosed.

20 Claims, 12 Drawing Sheets

CLOSEOUT SEAL FOR AIRCRAFT CABIN ASSEMBLY AND METHOD

TECHNOLOGICAL FIELD

The present disclosure relates generally to the field of gap management between adjacent structures. More specifically the present disclosure relates to the field of gap management between adjacent structures in aircraft cabin environments.

BACKGROUND

Aircraft cabins comprise an abundance of aircraft cabin structures and aircraft cabin components for aircraft cabin structures that are selected and positioned adjacent one another for purposes that can include space efficiency, ease of installation, removal, replacement, etc. In an aircraft passenger cabin, the dynamic nature of the aircraft itself during transit can cause movement of adjacently and/or proximately located cabin structures (e.g., structures positioned immediately adjacent to and/or otherwise in close relationship to one another, etc.) relative to one another during flight. In addition, part structure dimensions can include manufacturing tolerances such that gaps may be observed when parts and structures are joined together, or when parts and structures are placed in close relationship to adjacent parts and structures.

Unless explicitly identified as such, no statement herein is admitted as prior art merely by its inclusion in the Technological Field and/or Background section(s).

SUMMARY

According to one present aspect, an aircraft cabin assembly tubular seal for an aircraft cabin interior assembly is disclosed, with the aircraft cabin assembly tubular seal comprising a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension (referred to equivalently herein as a first open seal segment dimension). The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension (referred to equivalently herein as a second open seal segment dimension) identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/ second open seal segment second inwardly extending linear leg interface to form a joined two-piece tubular seal. The joined two-piece tubular seal comprises a joined two-piece tubular seal wall, said joined two-piece tubular seal wall comprising a joined two-piece tubular seal wall tubular seal wall first (exterior) side and a joined two-piece tubular seal wall tubular seal wall second (interior) side, with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

In another present aspect, the first open tubular seal section and the second open tubular seal section are joined together to form symmetrical mirror images of one another about a vertical axis at the first open seal segment first inwardly extending linear leg/second open seal segment first inwardly extending linear leg interface and the first open seal segment second inwardly extending linear leg/second open seal segment second inwardly extending linear leg interface.

In another present aspect, the joined two-piece tubular seal is a removable and reusable tubular seal.

In another present aspect, the joined two-piece tubular seal is a reusable tubular seal.

In another present aspect, the joined two-piece tubular seal is a closeout seal.

In another present aspect, first open seal segment first inwardly extending linear leg/second open seal segment first inwardly extending linear leg interface and the first open seal segment second inwardly extending linear leg/second open seal segment second inwardly extending linear leg interface each comprise a bonding surface configured to join together the first open tubular seal segment and the second open tubular seal section first open seal segment first inwardly extending linear leg/second open seal segment first inwardly extending linear leg interface and the first open seal segment second inwardly extending linear leg/second open seal segment second inwardly extending linear leg interface.

In a further present aspect, the aircraft cabin assembly tubular seal further comprises a tubular seal retaining element.

In another present aspect, the aircraft cabin assembly tubular seal further comprises a an integrated tubular seal retaining element, with the tubular seal retaining element integral with the joined two-piece tubular seal.

In another present aspect, the tubular seal retaining element is bonded to the joined two-piece tubular seal.

In another present aspect, the tubular seal retaining element is configured to mate with a tubular seal retainer strip, said tubular seal retainer strip configured to receive the tubular seal retaining element.

In another present aspect, the aircraft cabin assembly tubular seal further comprises a reinforcing insert, with the reinforcing insert dimensioned to fit longitudinally within the tubular seal cavity.

Another present aspect is directed to an aircraft cabin interior structure (referred to equivalently herein as an aircraft cabin structure) comprising an aircraft cabin assembly tubular seal, with the aircraft cabin assembly tubular seal comprising a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first (exterior) side and a joined two-piece tubular seal wall tubular seal wall second side (interior), with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

Another present aspect is directed to an aircraft comprising an aircraft cabin assembly tubular seal, with the aircraft cabin assembly tubular seal comprising a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first (exterior) side and a joined two-piece tubular seal wall tubular seal wall second side (interior), with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

Another present aspect is directed to an aircraft cabin assembly, with the aircraft cabin assembly comprising a first aircraft cabin structure, with the first aircraft cabin structure comprising a first aircraft cabin structure surface. The aircraft cabin assembly further comprises a second aircraft cabin structure comprising a second aircraft cabin structure end (referred to equivalently herein as an second aircraft cabin structure edge), with the second aircraft cabin structure edge positioned proximate to the first aircraft cabin structure surface, with the aircraft cabin assembly defining a gap between said first aircraft cabin structure surface and the second aircraft cabin structure edge, and with the second aircraft structure edge further comprising a tubular seal. The tubular seal comprises a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first (exterior) side and a joined two-piece tubular seal wall tubular seal wall second (interior) side, with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

In another present aspect, the first open tubular seal section and the second open tubular seal section joined together to form symmetrical mirror images of one another about a vertical axis at the first and second open seal segment inwardly extending linear leg interface.

In another present aspect, the first aircraft cabin structure comprises at least one of an aircraft cabin floor, an aircraft cabin ceiling, a storage bin, an aircraft cabin monument, an aircraft cabin wall, an aircraft cabin partition, and combinations thereof.

In another present aspect, the second aircraft cabin structure comprises at least one of an aircraft cabin floor, an aircraft cabin ceiling, a storage bin, an aircraft cabin monument, an aircraft cabin wall, an aircraft cabin partition, and combinations thereof.

Another present aspect is directed to an aircraft comprising an aircraft cabin assembly comprising, with the aircraft cabin assembly comprising a first aircraft cabin structure, with the first aircraft cabin structure comprising a first aircraft cabin structure surface. The aircraft cabin assembly further comprises a second aircraft cabin structure comprising a second aircraft cabin structure end, with the second aircraft cabin structure end positioned proximate to the first aircraft cabin structure surface, with the aircraft cabin assembly defining a gap between said first aircraft cabin structure surface and the second aircraft cabin structure end, and with the second aircraft structure end further comprising a tubular seal. The tubular seal comprises a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/ second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first side (e.g., an exterior side) and a joined two-piece tubular seal wall tubular seal wall second side (e.g., an interior side), with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

Another present aspect is directed to a method for sealing a gap adjacent an aircraft cabin structure, with the method comprising installing a first aircraft cabin structure into an aircraft cabin and further installing a second aircraft cabin structure adjacent to a first aircraft cabin structure to form a first aircraft cabin structure/second aircraft cabin structure interface, with at least one of said first aircraft cabin structure and said second aircraft cabin structure comprising a tubular seal. The tubular seal is configured to be fixedly attached to the second aircraft cabin structure, with the tubular seal positioned at a first aircraft cabin structure/ second aircraft cabin structure interface. The tubular seal comprises The tubular seal comprises a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/ second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first side and a joined two-piece tubular seal wall tubular seal wall second side, with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

In another present aspect, a method further comprises interposing said tubular seal between the first aircraft cabin structure and the second aircraft cabin structure.

In another present aspect, a method further comprises maintaining an outward force in the tubular seal between the first aircraft cabin structure and the second aircraft cabin structure, with the outward force opposing the inwardly compressive force.

In another present aspect, a method further comprises forming a closeout seal at the first aircraft cabin structure/ second aircraft cabin structure interface.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
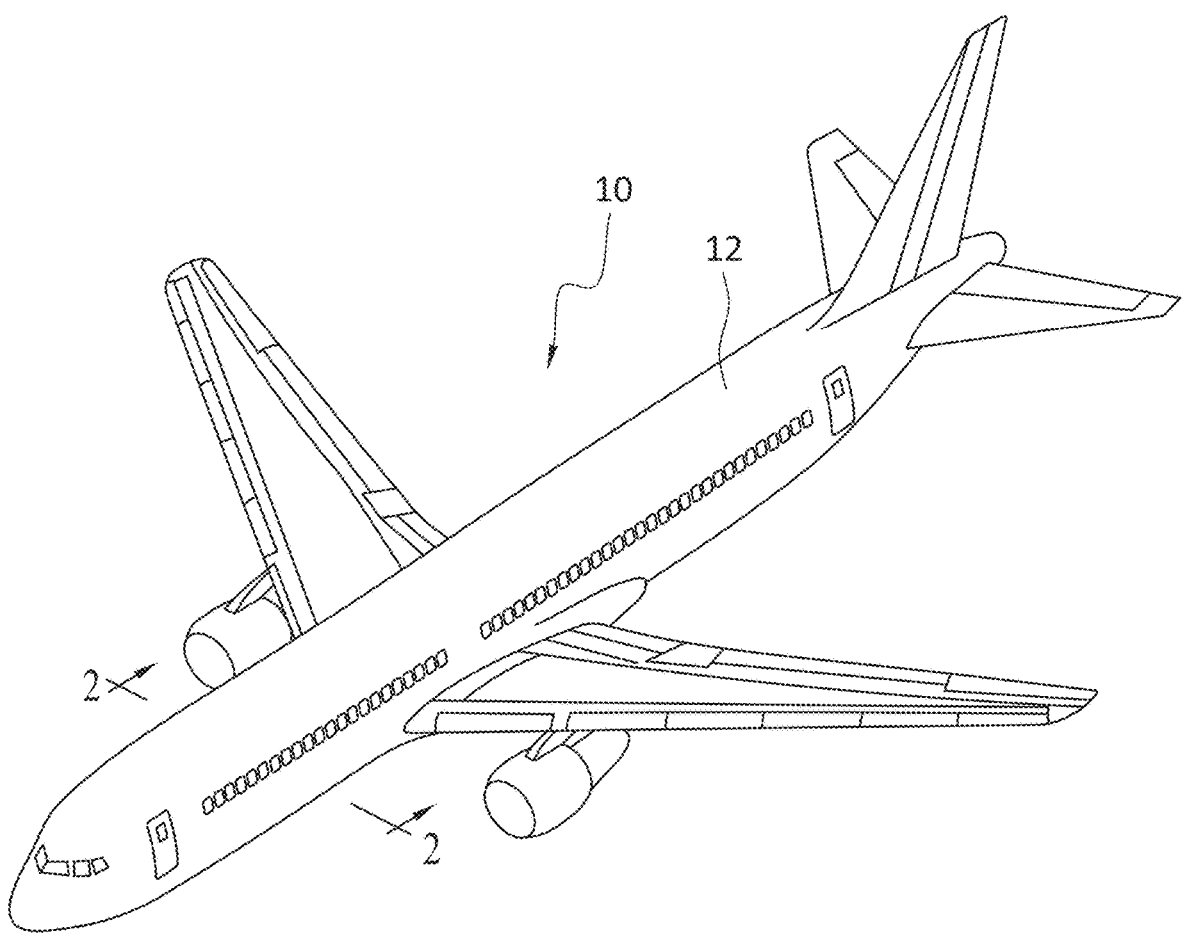
Figure 2:
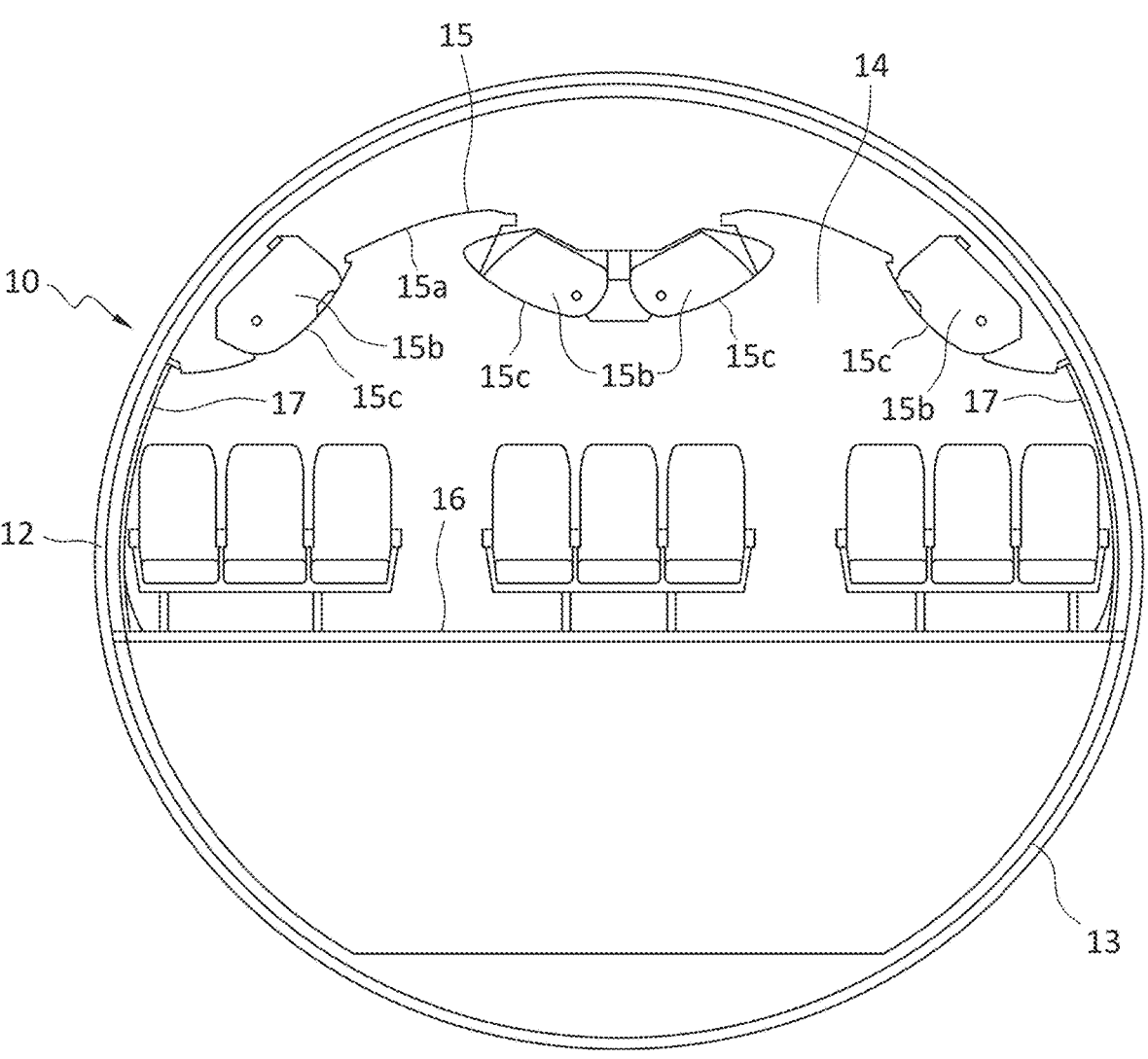
Figure 3:
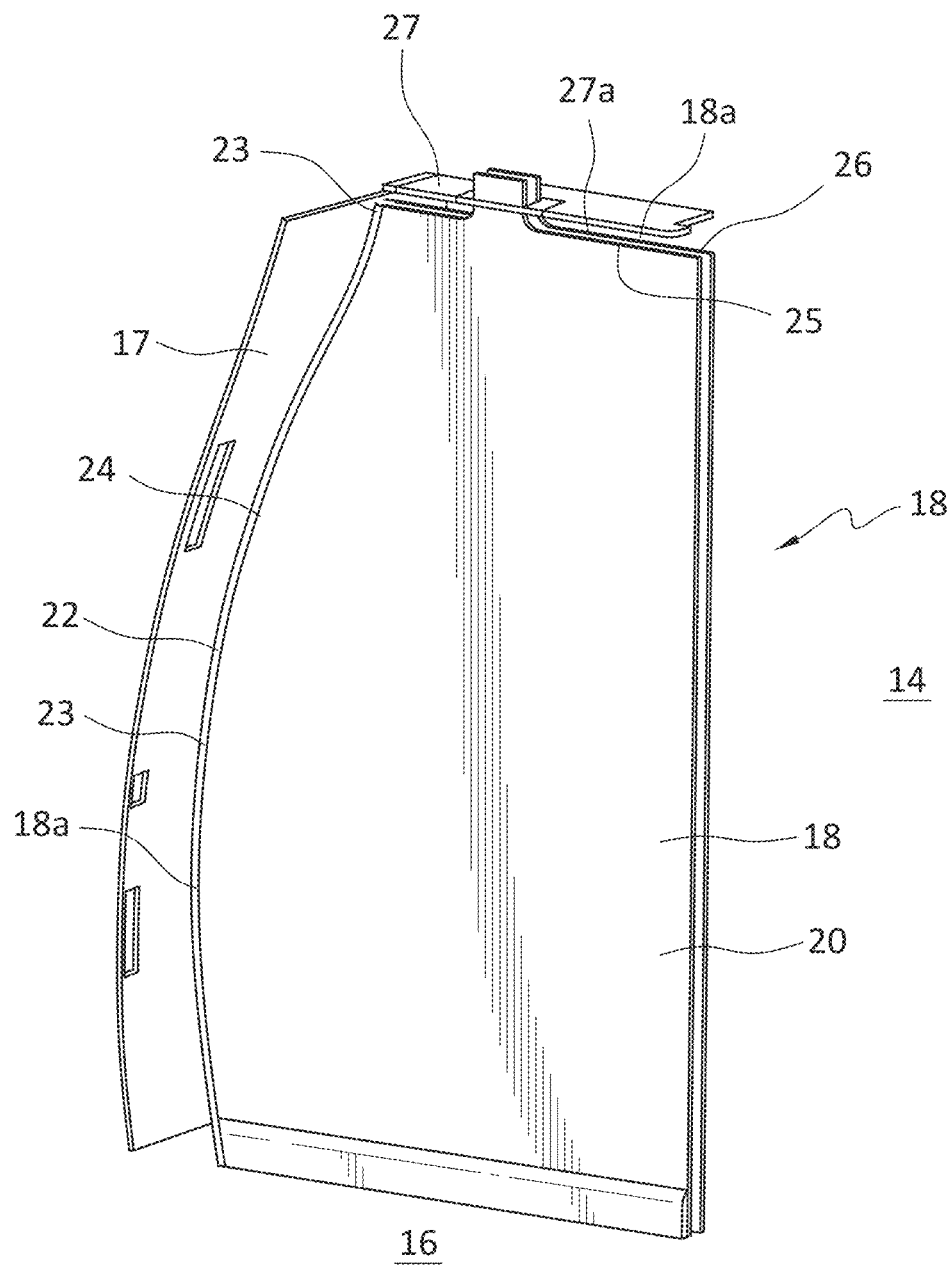
Figure 4:
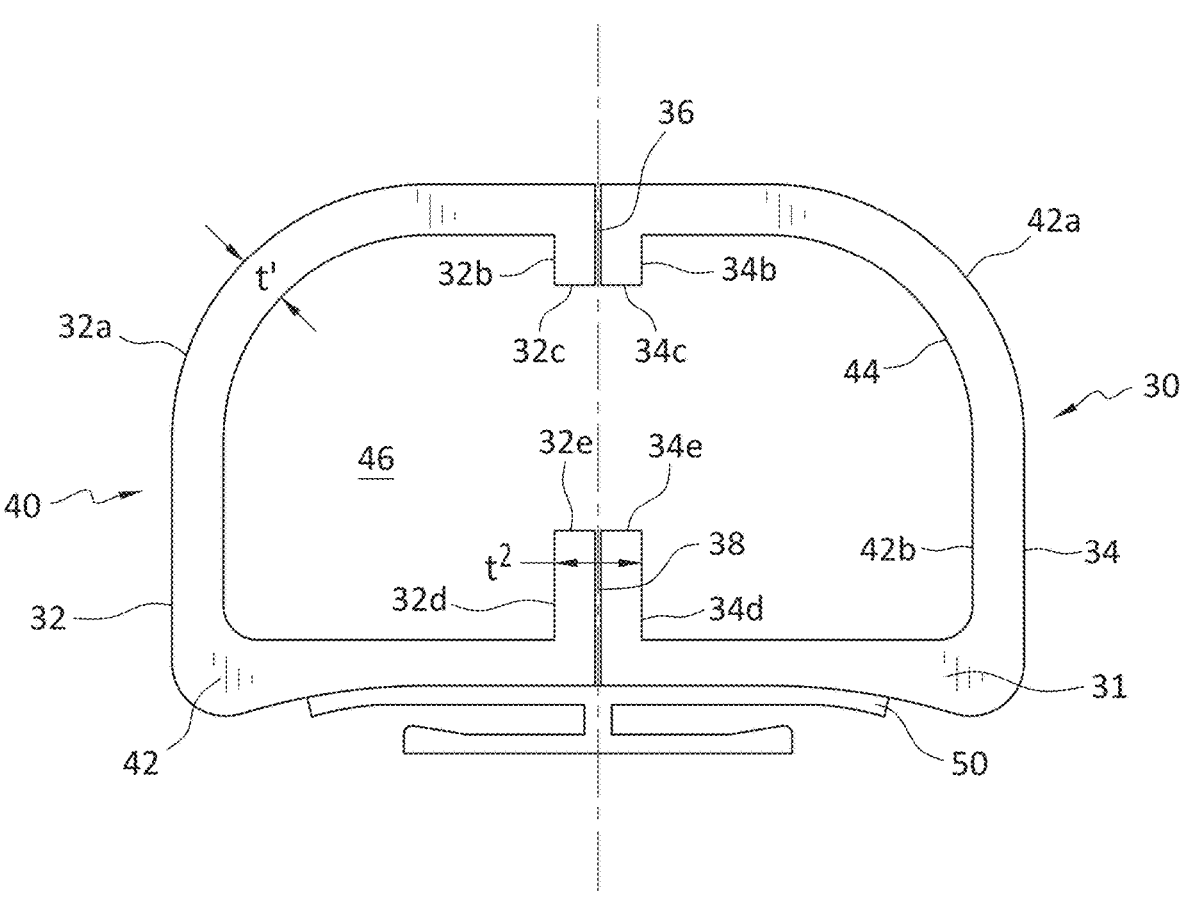
Figure 5A:
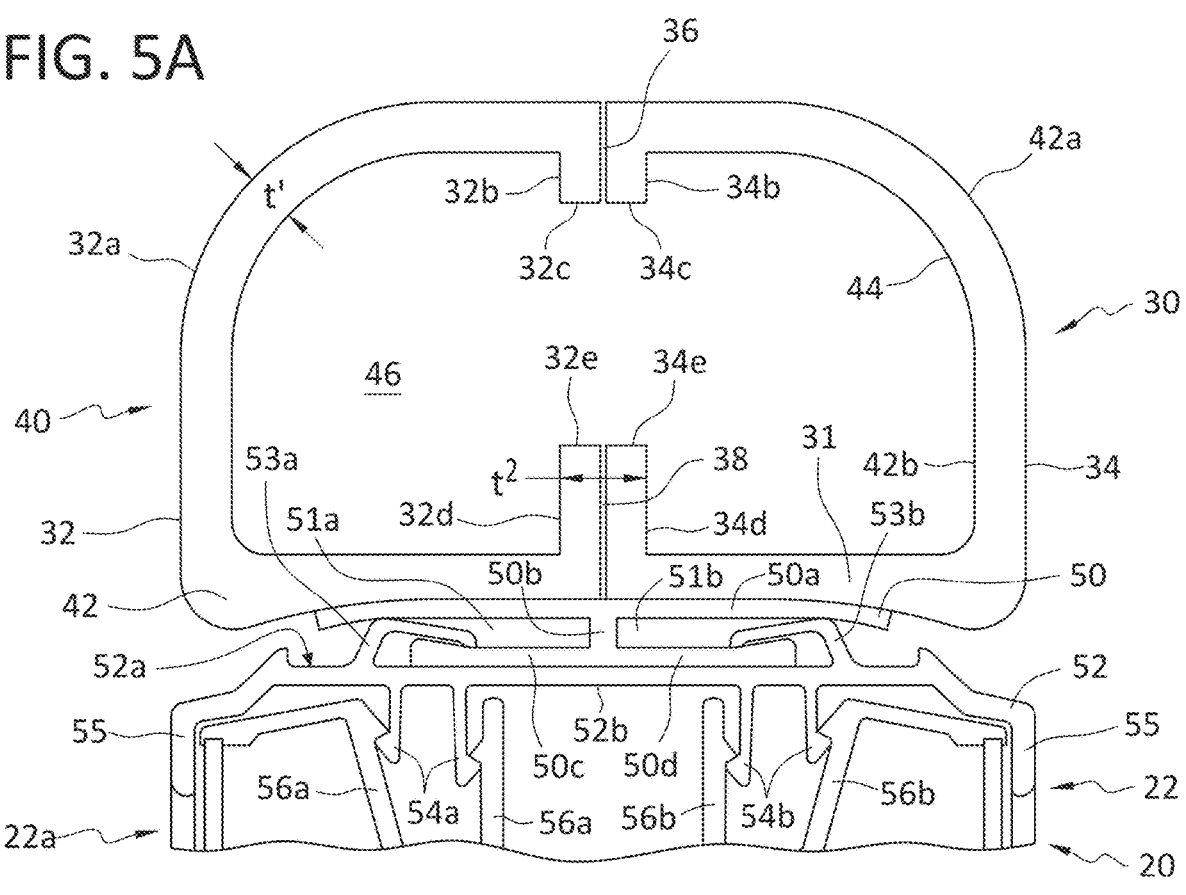
Figure 5B:
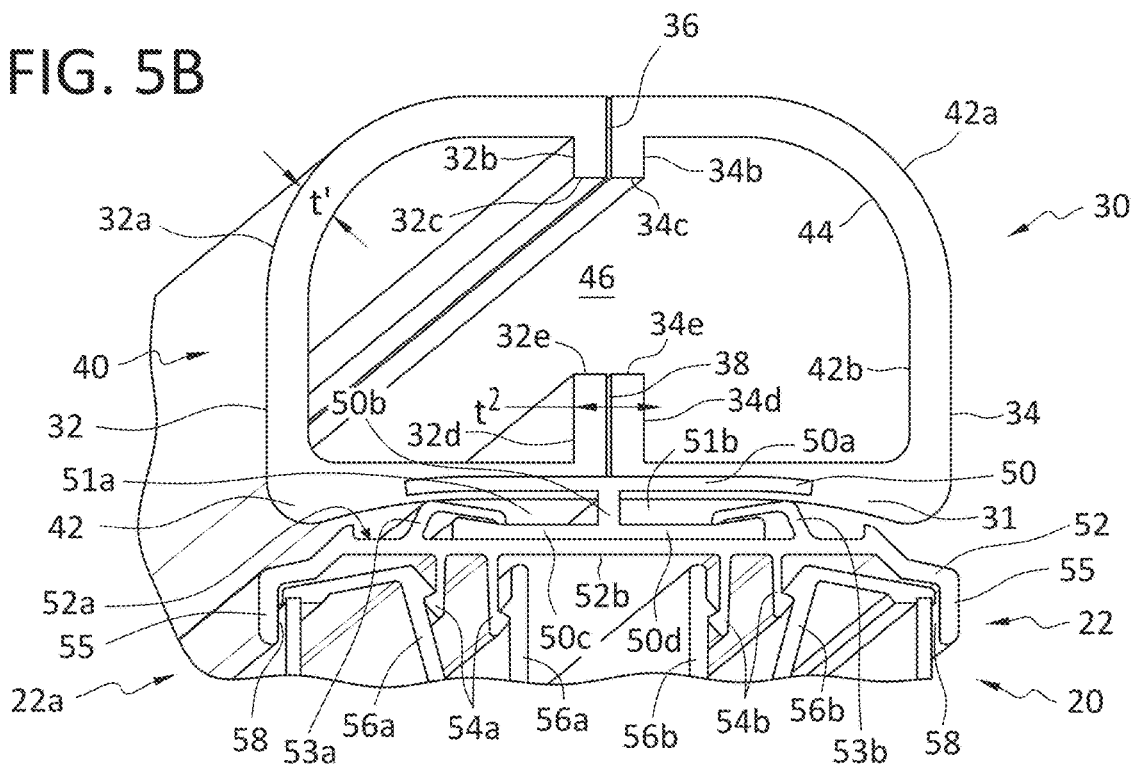
Figure 5C:
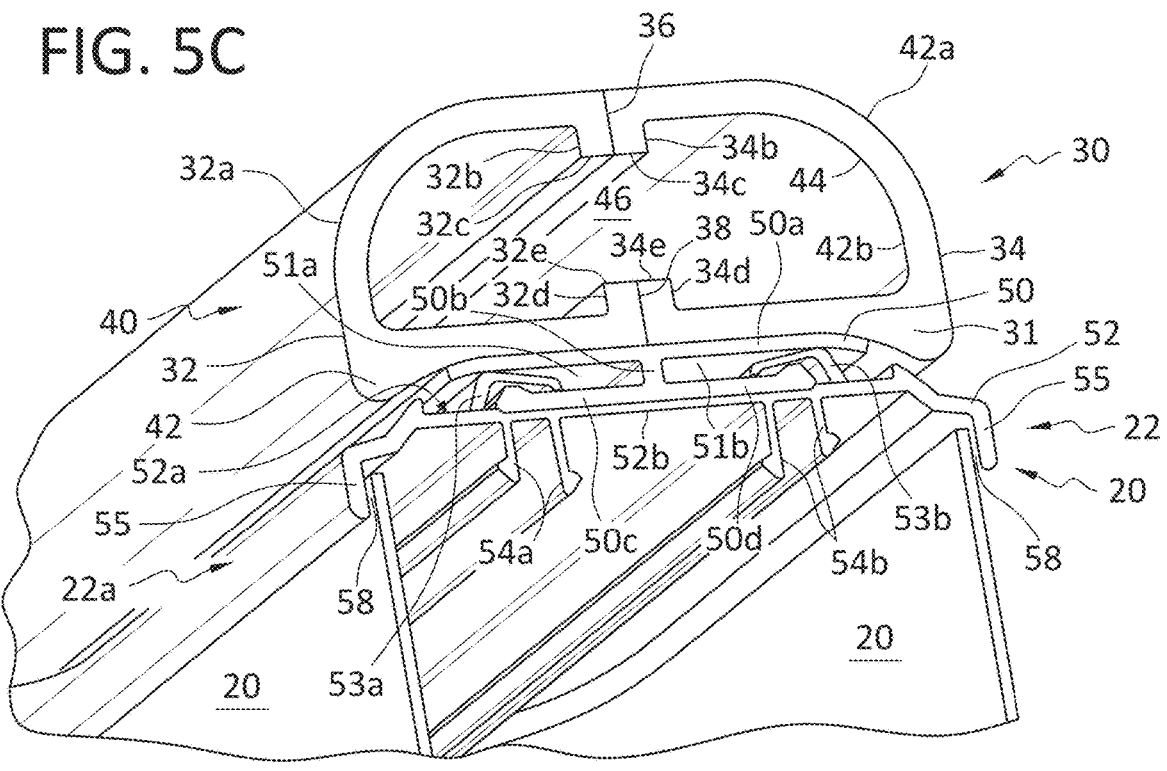
Figure 6A:
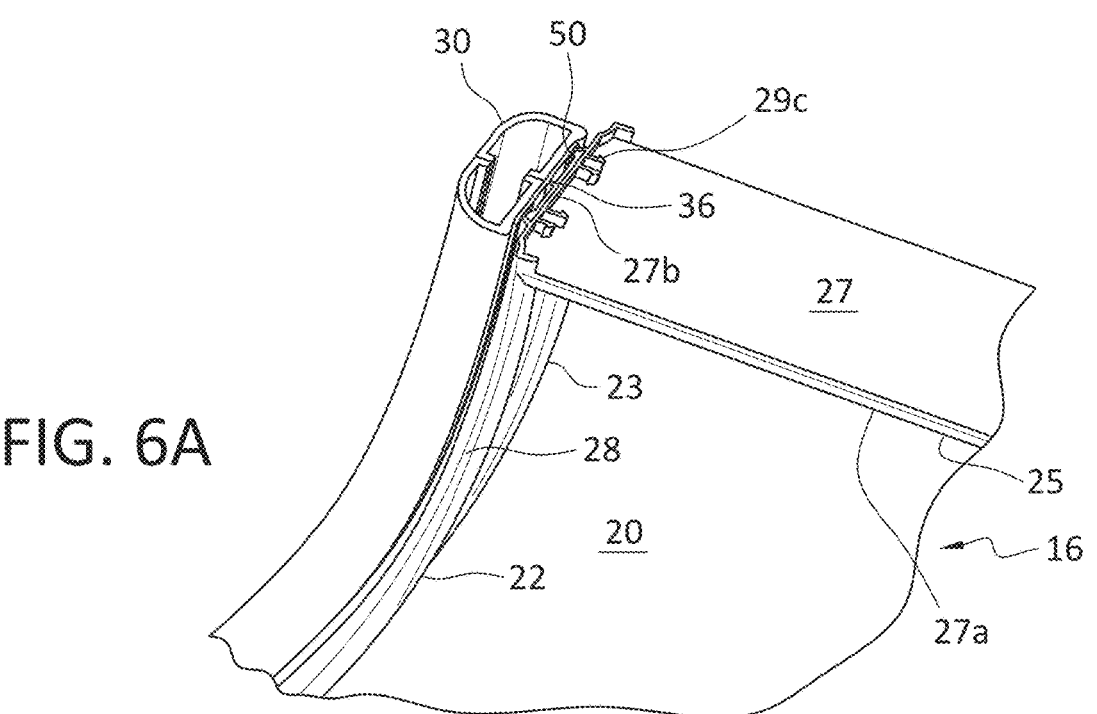
Figures 6B, 7A:
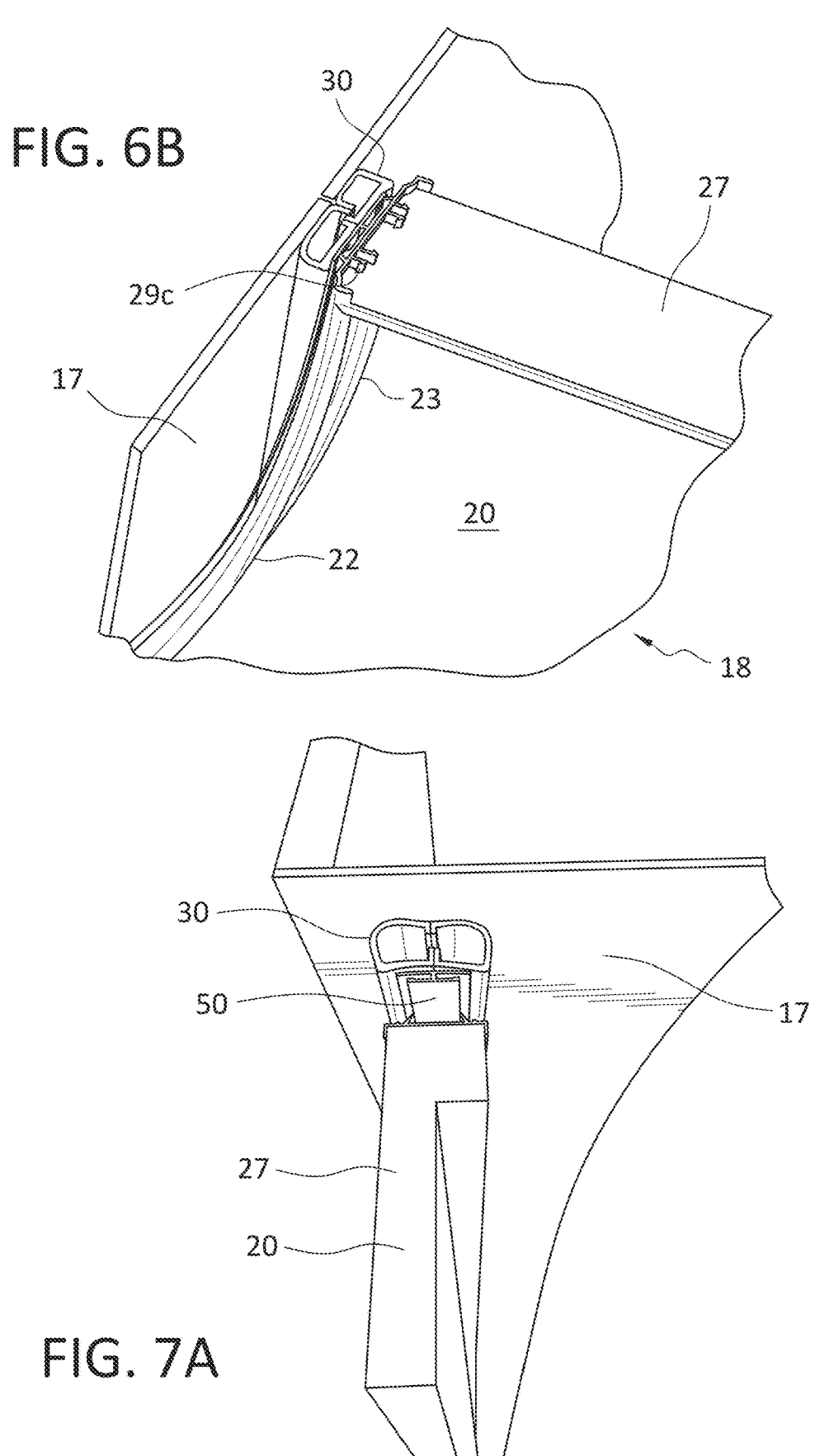
Figures 7B, 8:
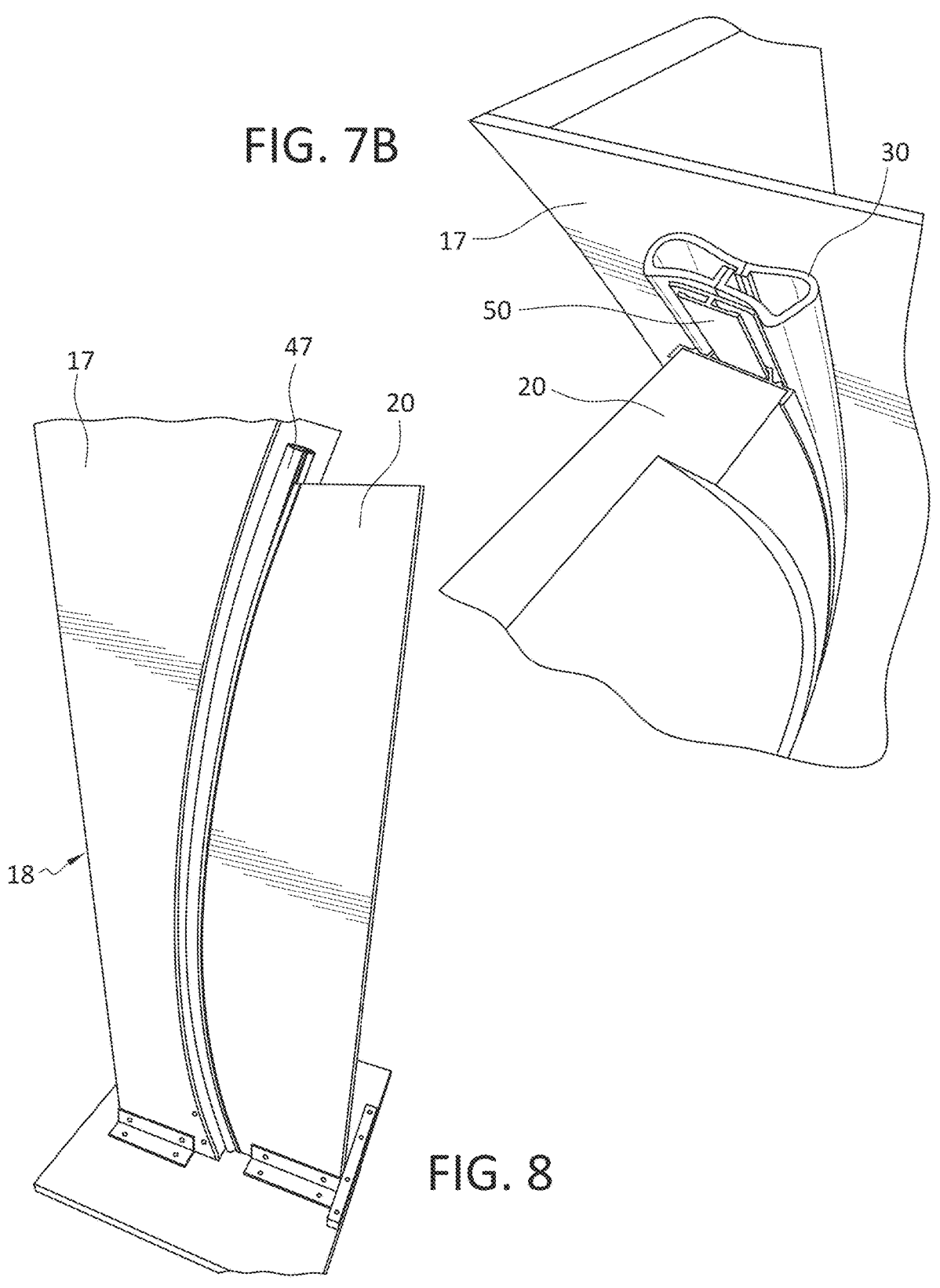
Figure 9:
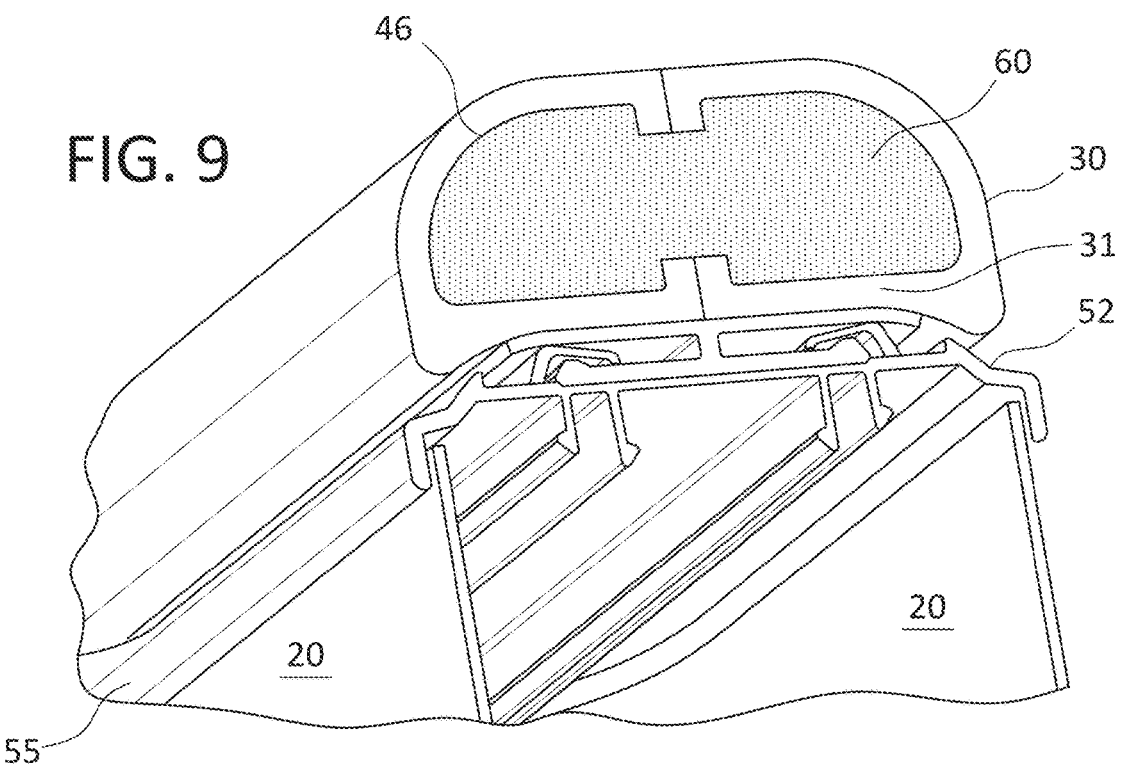
Figure 10:
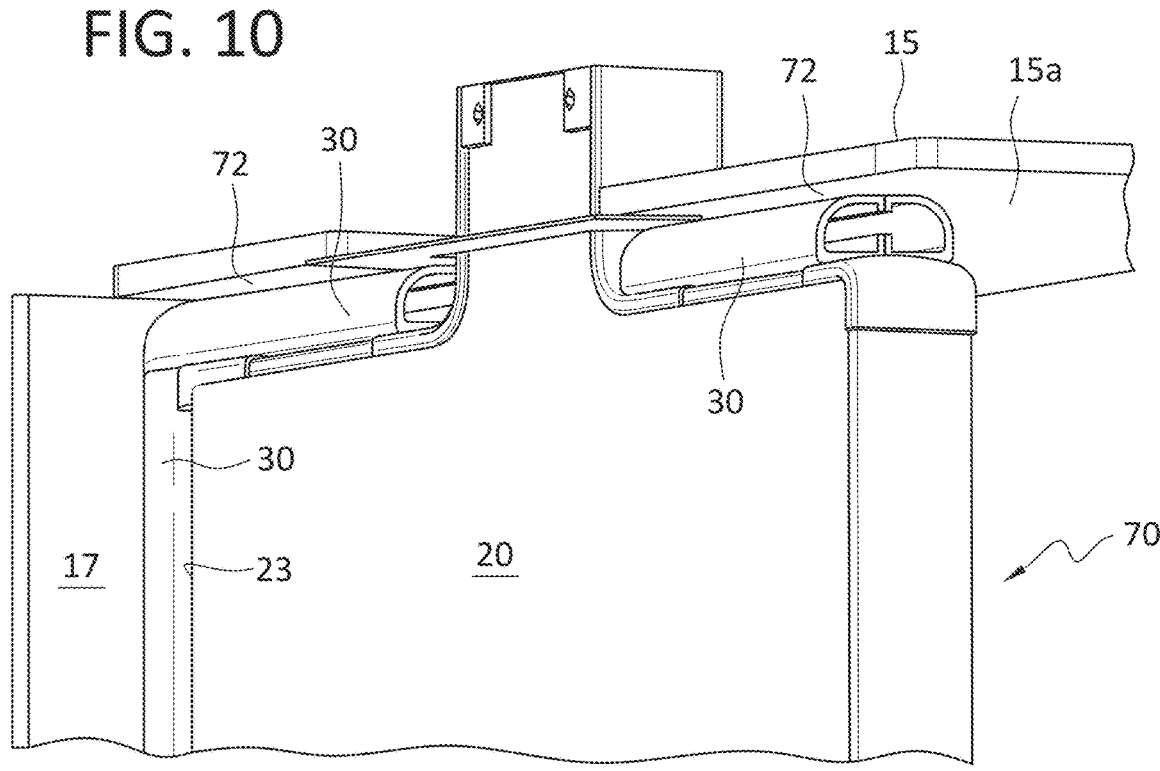
Figure 11:
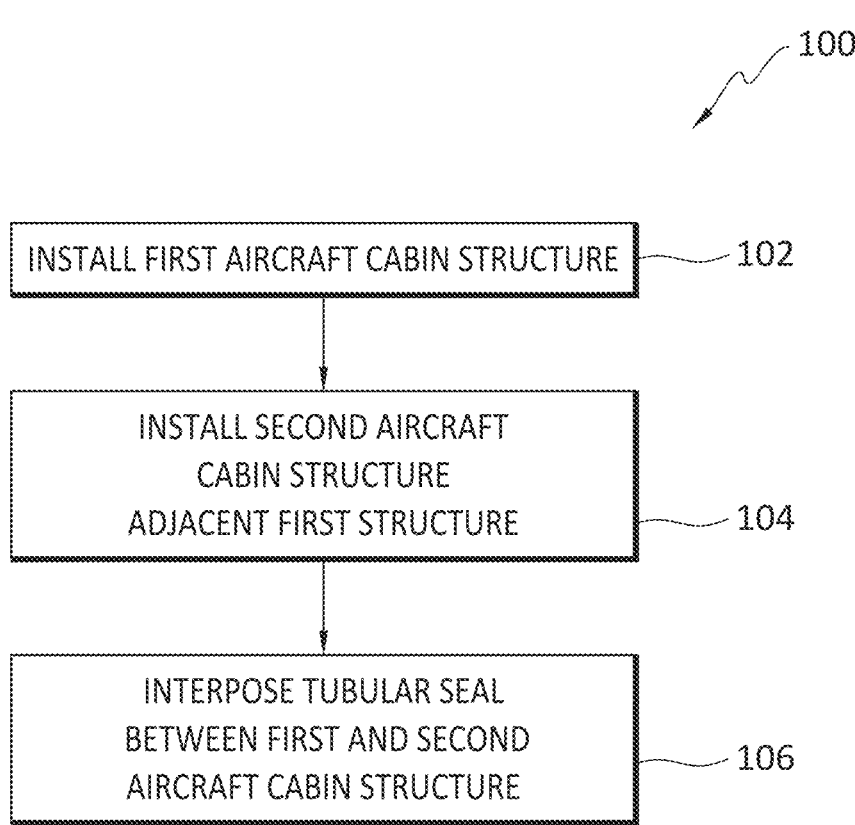
Figure 12:
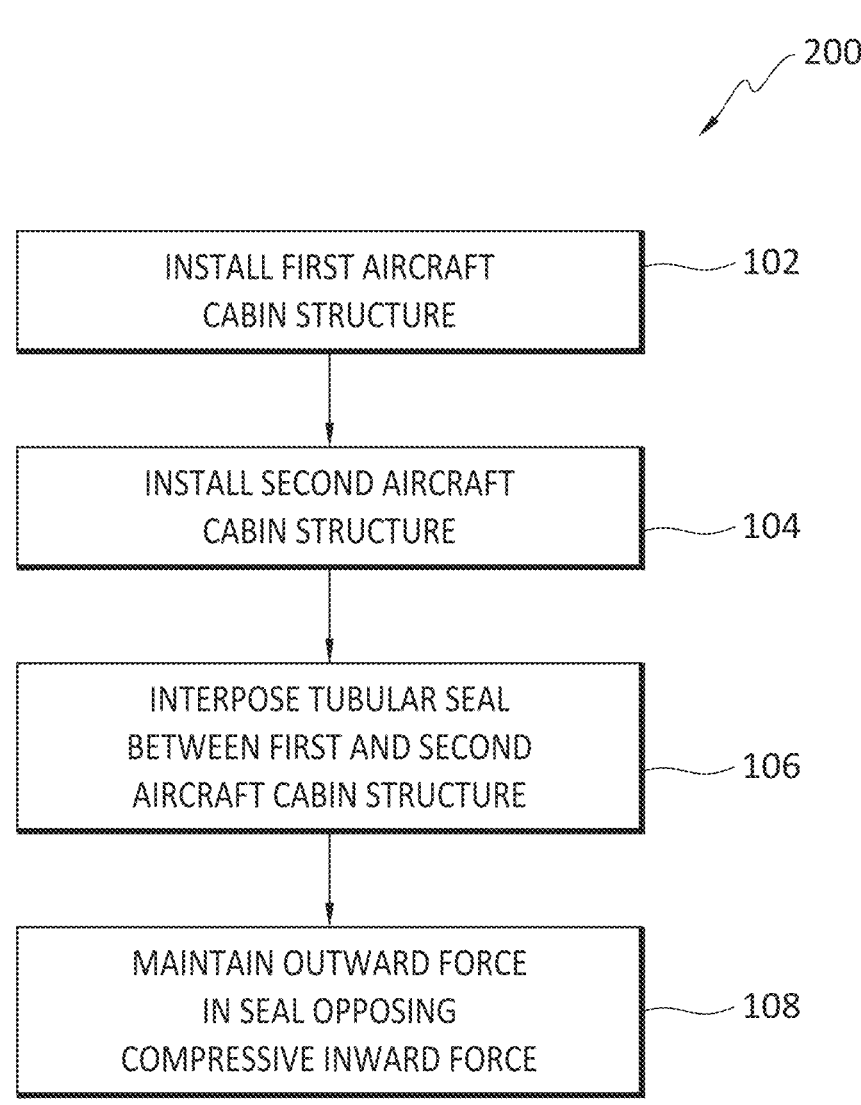
Figure 13:
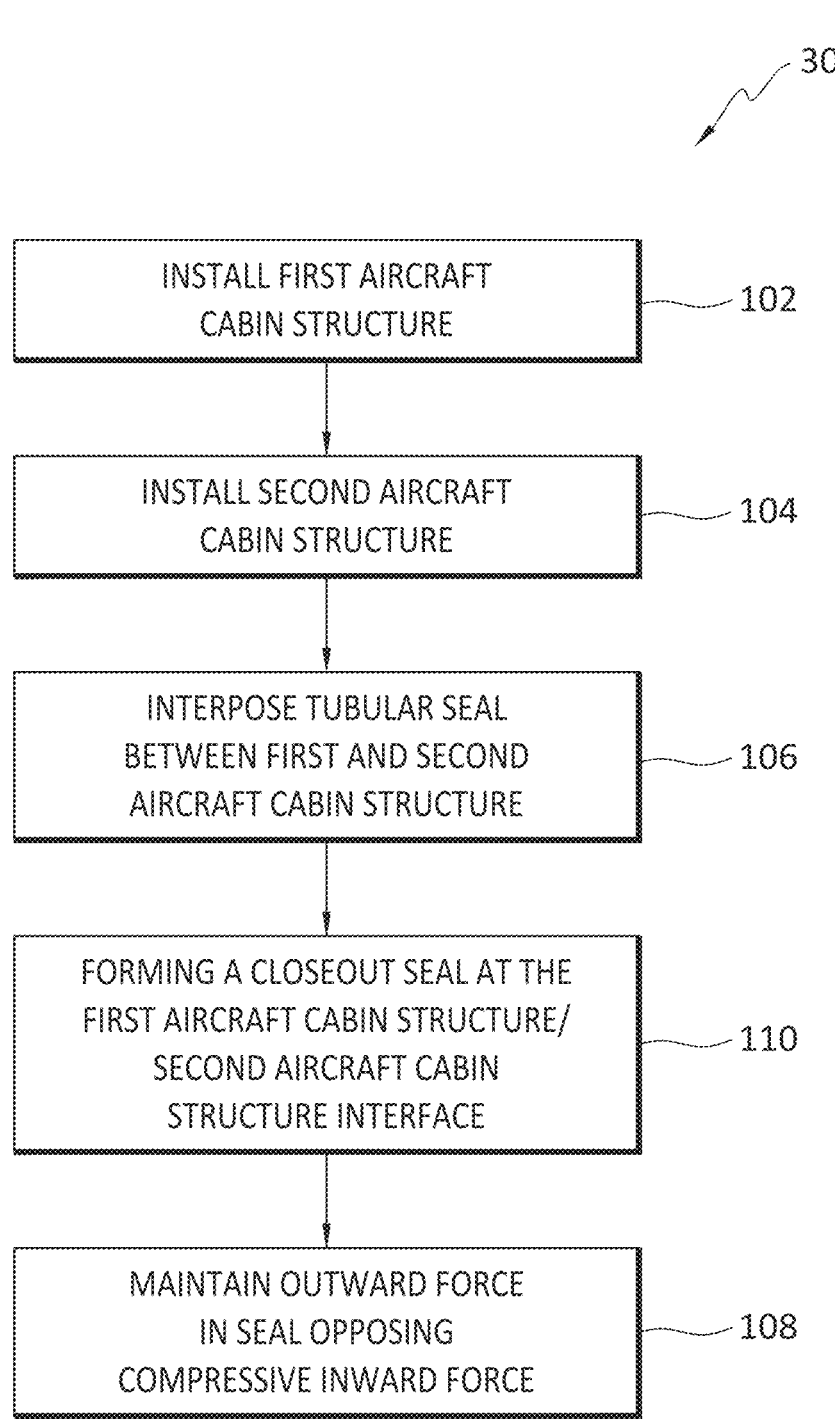

Having thus described variations of the disclosure in general terms, reference will now be made to the accompanying drawings, which are not necessarily drawn to scale, and wherein:

FIG. 1 is a perspective view of an aircraft, according to present aspects;

FIG. 2 is a cross-section view of an aircraft, according to present aspects;

FIG. 3 is a perspective view of aircraft cabin structure in the form of a partition, according to present aspects;

FIG. 4 is a cross-sectional end view of a joined two-piece tubular seal, according to present aspects;

FIG. 5A is a cross-sectional end view of a joined two-piece tubular seal attached to an aircraft cabin structure, according to present aspects;

FIG. 5B is a perspective view of a joined two-piece tubular seal attached to an aircraft cabin structure, according to present aspects;

FIG. 5C is an enlarged partial view of the joined two-piece tubular seal attached to an aircraft cabin structure of the type shown in FIG. 5B, according to present aspects;

FIG. 6A is a partial view of an aircraft cabin structure in the form of a partition of the type shown at least in in FIG. 3, with a presently disclosed tubular seal shown in place fixedly and removably engaged with the partition, according to present aspects;

FIG. 6B is an enlarged partial view of an aircraft cabin structure in the form of a partition of the type shown at least in FIG. 6A, with a presently disclosed tubular seal shown in place fixedly and removably engaged with the partition and with the tubular seal interposed between a partition and an adjoining aircraft cabin structure in the form of a side wall, according to present aspects;

FIG. 7A is a partial view of the present tubular seal interposed between first and second aircraft cabin structures, with the tubular seal fully occupying a gap between structures, with the gap having a first dimension and the tubular seal compressed, according to present aspects;

FIG. 7B is a partial view of the present tubular seal interposed between first and second aircraft cabin structures of the type shown in FIG. 7A, with the tubular seal fully occupying a gap between structures, and with the tubular seal incurring a greater compressive force as the gap dimension decreases, according to present aspects;

FIG. 8 is a partial perspective view of a presently disclosed tubular seal in place between adjacent first and second aircraft cabin structures, according to present aspects;

FIG. 9 is an enlarged partial cross-sectional end view of the presently disclosed tubular seal in place fixedly and removably engaged with a partition, with an insert present within the tubular seal cavity, according to present aspects;

FIG. 10 is a partial perspective view of a presently disclosed tubular seal in place between adjacent first and second aircraft cabin structures, according to present aspects;

FIG. 11 is a flowchart outlining a method, according to aspects;

FIG. 12 is a flowchart outlining a method, according to aspects;

FIG. 13 is a flowchart outlining a method, according to present aspects.

DETAILED DESCRIPTION

Resilient performance of the presently disclosed tubular seal construction can provide a durable seal that can, for example, repeatedly compress and then expand and "return toward" an initial or starting configuration or cross-sectional geometry once compressive forces on the seal change, abate, and/or no longer impact the seal. That is, according to present aspects, when a presently disclosed tubular seal is installed between and interposed into a gap (e.g., to fill a gap) that can occur between aircraft cabin structures, a compressive force can be delivered to the seal by the adjacent aircraft cabin structures between which the tubular seal is interposed. As the tubular seal is installed between aircraft cabin structures, compressive forces from the adjacently positioned aircraft cabin structures exert a compressive force inwardly on the tubular seal, with the tubular seal configured to absorb and deflect a portion of the compressive forces such that the tubular seal under force can deform to a selected amount or degree, and can further deform to a selected cross-sectional geometry that can be different from the initial cross-sectional geometry of the tubular seal that is not under a compressive force.

Unlike typical seals that may be in use, the presently disclosed tubular seals are constructed by joining (e.g., bonding) two identical lengths or segments of open tubing that are each "U-shaped" and/or "horseshoe-shaped", with each length of open tubing having an arcuate middle portion that extends toward a first and second "end", and with the first and second "end" terminating in an inward direction (e.g., "inward" relative to the arcuate middle region) to form inwardly extending "legs". When the two identical open tubing segments (referred to equivalently herein as "open seal segments") are positioned along the same longitudinal axis such that the "legs" face each other and "match up", the outer surfaces of the legs of the two open tubing segments are aligned and bonded together to form a joined two-piece tubular seal construction that is substantially "oval", and that is now "closed". It is the joined two-piece tubular seal that forms the present tubular seals and that has an internal longitudinal tubular seal cavity bounded by the two joined seal segments that, before joining, were formerly "open" segments).

The present tubular seals are designed to sustain repeated and varying degrees of deformation along their length when the seals are in operation and interposed between adjacent aircraft cabin interior structures to fill a "gap" occurring between the adjacent and nearly adjoining aircraft cabin structures. The present tubular seals can perform the function of closeout seals between aircraft cabin structures in an aircraft, with the tubular seals configured to deform or compress to a selected degree when a certain level of compressive force is applied to them from one or more directions.

According to present aspects, the present tubular seal completely fills a gap between adjoining aircraft cabin structures, even when the gap between structures either uniformly or non-uniformly changes dimension along the gap length (e.g., the gap width can uniformly and/or non-uniformly increase or decrease along the gap length, etc.) during, for example, the various flight phases (e.g., taxi, takeoff, flight, landing, etc.), and at times when the position of adjoining structures may move slightly relative to one another. The present interposed tubular seal serving a closeout seal function maintains an intimate fit and remains in continuous contact with the surfaces of adjoining structures to, for example, maintain light-blocking ability, increase stability and integrity of the seal, and increase stability and integrity of the of the adjoining aircraft cabin structures (e.g., by eliminating or significantly reducing vibrations, rattling, a deleterious over-shifting of cabin structure position, etc.). The present tubular seal also improves seal and adjoining structure performance and longevity, facilitates maintenance, inspection, and installation of the tubular seal, and facilitates maintenance, inspection, and installation of the aircraft cabin assemblies comprising the tubular seals (as the seal can be removable and reusable), etc.

In the compressed state, the tubular seal can be further securely positioned and/or fixedly attached to more completely occupy or "fill" an existing gap between aircraft cabin structure interfaces than could be accomplished previously. In another aspect, the tubular seal can be removably attached and can otherwise be removable, for example, to facilitate maintenance, rework, etc. In a further aspect, the tubular seal can be reusable. In one example, an interposed tubular seal can incur and respond to variable and varying degrees of compressive forces along the length of the tubular seal. That is, the degree of inward deformation and the opposing outward force of the present tubular seal can, in real time, in resilient and repeated fashion maintain tubular seal contact with adjoining aircraft cabin structure surfaces along the tubular seal length, even as the degree and amount of compressive forces vary along the length of the tubular seal.

The tubular seal can be made from a resilient polyurethane foam material that can be a closed cell polyurethane foam that can maintain an initial dimension and/or geometry, that can then repeatedly and selectively deform inwardly under compressive force to a selected degree to a compressed dimension. The compressed tubular seal can then, in the absence of or in the abeyance of a compressive force, repeatedly and reliably expand toward a form, dimension, and/or geometry that can be substantially similar to the initial cross-sectional geometry and/or initial dimension of the tubular seal. "Initial cross-sectional geometry" refers to the initial or starting dimension and cross-sectional geometry of the present tubular seal in the absence of any inward compressive force exerted on the seal.

According to present aspects, compression set is a measure of a material's ability to rebound after being compressed (typically 50% for foam materials) from a material's original or initial dimension (e.g., a material's initial "thickness", etc.). As some foams are compressed under elevated temperatures, a "low" compression set value is desirable, according to present aspects. A material's compression set of 0% connotes that a material has completely rebounded from a compressed state toward an original or initial non-compressed state. According to present aspects, a material having or exhibiting a "high" compression set value is not desirable. A "high" compression of 100% means that the material has not rebounded from a compressed state toward an initial or original dimension in a non-compressed state.

Compression deflection is the measurement of how much force is needed to compress a material to a known percentage (typically about 25% for foams). Compression deflection can be closely related to the foam Grade or foam Type. The lower the compression deflection value, the "softer" or "more pliable" or more "easily deformable" the material will be. The higher a compression deflection value is for a material, the "firmer" or "less pliable" or less subject to deformation, or more "rigid" or the material will be at a particular compressive force.

The materials selected for use in the construction of the tubular seals can be a uniform or a heterogenous material having, for example, a Young's modulus or other rigidity value, etc., within a useful range to deform and to deliver a selected outward force to "spring" the configuration of the tubular seal outwardly in the absence or abating of an incurred compressive force and return toward an original and/or an initial dimension and cross-sectional geometric form in the absence or abatement of an inward compressive force. In one example, the tubular seal can comprise a high impact and high compressive strength solid foam that can be a closed cell foam material that can include, for example, a polyurethane foam material.

In one example, the polyurethane foam selected for use possesses a compression force deflection at 50% of about 35 (+/−15) psi at a preferred wall thickness ranging from about 0.1000 to about 0.1500 inches. In another example, the polyurethane foam selected for use can have a molded density ranging from about 20 (+/−2) lb/cubic foot.

According to one present example, selected materials can be subjected to indentation force deflection tests in accordance with ASTM D 3575, and/or ISO 7214, at 25 percent compression deflection. A nominal deflection range with adjacent interfaces can be engineered for 0.80-1.10 inches.

The thickness profile of the present tubular seal can be selected such that the tubular seal will selectively deform (e.g., selectively and resiliently partially collapse, etc.) to a selected degree as the tubular seal is exposed to and/or endures and/or incurs a compressive force inwardly upon the tubular seal (e.g., when the seal is installed and in use, etc.).

In addition, the material selected for the presently disclosed tubular seal geometry in combination with the selected physical location and dimension of the variable wall thicknesses along the tubular seal interior profile at the tubular seal "leg interfaces" can provide the present tubular seal with a selected degree of resilience and "springiness" that allows the tubular seals to oppose a compressive force on the tubular seal when a compressive force is present, and to reclaim or otherwise return toward at least an approximate original, or initial form, dimension, and cross-sectional geometry when compressive force is removed from the seal, or when inwardly directed compressive forces abate or otherwise change due to, for example, a shift in position of the aircraft cabin structures that surround the tubular seal that can occur during, for example, various flight phases.

The movement, for example, during flight, etc., of the surrounding and/or adjacent aircraft cabin structures relative to one another can change the dimension of a gap that exists at the interface of adjoining aircraft cabin structures (e.g., an initial dimension of a gap "width" at a adjoining structures' near interface, etc.). The present resilient tubular seal can expand outwardly from a compressed condition to an expanded condition to automatically expand to a degree necessary to completely occupy and otherwise "fill" an expanding or changing gap dimension, in real time, as the outward force of the resilient tubular seal causes the dimension of the seal to return toward a less compressed condition when a compressive force on the interposed tubular seal may abate or otherwise change through, for example, a periodic dynamic movement of the surrounding adjacently positioned aircraft cabin structures during one or more flight phases, etc.

According to present aspects, the resilient tubular seals can be used between any useful aircraft cabin structures for the purpose of increasing the stability of adjoining and adjacent aircraft cabin structures (e.g., eliminating rattling or shifting of the structures during flight) as well as for the purpose of providing seals having increased capacity with respect to, for example, continuously and uninterruptedly blocking light, sound, etc., from passing between gaps that may occur between adjacent aircraft cabin structures that are positioned, for example, between aircraft passenger sections (e.g., partitions and other structures separating, for example, first class, business class, economy class, etc.)

The construction of the tubular seals, according to a present aspect, can incorporate multiple materials used in various locations within the tubular seal. For example, the arcuate middle regions and the inwardly extending "legs" can be made from the same material or can be made from different materials. Further, tubular seal wall regions may each comprise multiple materials, and may have varying amounts (e.g., one or more layers of one or more materials and one or more material types within one or more tubular seal wall regions) of multiple materials so that, for example, certain tubular seal wall region thicknesses are stiffer or more resilient or less resilient, or provide varying selected amounts of outward radial force, etc.

According to present aspects, the interposed tubular seal is configured to respond to compressive forces imparted inwardly on the seal, (for example, during use) by the adjacently positioned aircraft cabin structures. When the compressive forces are within a selected useful range, the present tubular seals, in the absence or abatement of imparted compressive forces, can expand toward an original or initial tubular seal configuration, with the tubular seals comprising a requisite outward force that enables the compressed tubular seal (in the absence or abatement of a compressive force) to expand toward an original or initial dimension (e.g., a "pre-compression" and/or "non-compressed" dimension, etc.). Accordingly, the presently disclosed tubular seals are made from material that is selected to withstand compressive forces without the tubular seals crushing, rupturing, buckling, bulging, breaking, delaminating, etc., and with the present tubular seals comprising the capacity to retain the ability to reliably, resiliently, and repeatedly expand from a compressed state (as a compressive force abates, etc.) resiliently, and otherwise repeatedly deliver an outward force to "spring" outwardly back toward a cross-sectional geometry, in real time, that can be close to and/or substantially identical to the initial cross-sectional geometry of the tubular seal in a "pre-installation" or "new" condition, over a significantly large number of compression cycles.

According to present aspects, "male" seal retainer elements that are integral with, bonded and/or otherwise affixed to, or that are otherwise associated with (and that can protrude from and otherwise form a portion of the tubular seal exterior surface) the elongated tubular seals are configured to engage complementary "female" channels and/or recesses provided in at least one retainer strip that can be a discrete component that can be incorporated into, affixed to, or that can be integral with an aircraft cabin structure (e.g., a presently disclosed seal retainer strip described more fully herein) that is positioned adjacent a gap to be sealed by the presently disclosed elongated tubular seals. Further, according to present aspects, the elongated tubular seals can comprise an integral "female" recess or channel along a region of the exterior surface of the tubular seal such that the recess is complementary to and that can engage with a "male" retaining feature (e.g., a presently disclosed seal retainer strip) that can be provided on at least one aircraft cabin structure that is adjacent an aircraft cabin structure gap to be sealed by the presently disclosed elongated tubular seals.

The accompanying FIGs. are provided and described herein to further illustrate aspects of the present disclosure. FIG. 1 is a perspective view of an aircraft 10 comprising an aircraft fuselage 12, with the aircraft 10 being of the type that can comprise an aircraft cabin substantially bounded by an aircraft cabin outboard wall (equivalently referred to herein as a "sidewall") positioned within the aircraft fuselage interior (e.g., shown in FIG. 2).

The aircraft cabin can comprise aircraft cabin structures that can be or that can be combined to form aircraft cabin assemblies that can include, or that can be positioned adjacent to, for example, other aircraft cabin structures and other aircraft cabin assemblies including, for example, aircraft cabin monuments, aircraft cabin ceilings, aircraft cabin floors, storage bins, partitions, etc. The adjacently positioned aircraft cabin structures further can comprise and otherwise incorporate presently disclosed tubular seals, for example, between aircraft cabin assemblies, aircraft cabin structures, etc.

FIG. 2 is a representative cross-sectional view of the aircraft 10 that can be of the type shown in FIG. 1 taken along line 2-2. As shown in FIG. 2, aircraft cabin 14 is substantially bounded by aircraft cabin ceiling surface 15a of aircraft ceiling 15, aircraft cabin floor 16, and aircraft cabin outboard wall 17 (referred to equivalently herein as "sidewall" 17) positioned within aircraft fuselage interior 13. Storage bins 15b comprising storage bin surfaces 15c are further shown in position, fixedly attached to structural components (not shown in FIG. 2) with the storage bins 15b positioned in close proximity to sections of aircraft cabin ceiling 15.

FIG. 3 is an enlarged view of a representative and non-limiting aircraft cabin assembly 18 of a type that can be found in an aircraft cabin 14 of the type shown, for example, in FIG. 2 of an aircraft 10 of the type shown, for example, in FIGS. 1 and 2. FIG. 3 shows a first aircraft cabin structure 20, shown in the form of a partition, that is shown positioned adjacent to and substantially perpendicular to an interior surface of a second aircraft cabin structure, shown in the form of sidewall 17. First aircraft cabin structure 20 comprises a first aircraft cabin structure first edge 22 positioned immediately adjacent to the second aircraft cabin structure 17 at a first aircraft cabin structure/second aircraft structure interface 24 in the form of a partition/sidewall interface 24, with first aircraft cabin structure first edge gap 23 (that is one type of aircraft cabin assembly gap 18a) occurring at the first aircraft cabin structure/second aircraft structure interface 24 (shown in FIG. 3 as a partition/sidewall interface 24), and with the first aircraft cabin structure first edge gap 23 (shown in FIG. 3 as a partition first edge gap 23) formed and bounded at the partition/side wall interface 24 by the partition first edge 22 and the adjacent aircraft cabin sidewall 17.

FIG. 3 further shows a first aircraft cabin structure (shown as a partition) second edge 25 (shown as a partition second edge 25) located at the "top" of the first aircraft cabin structure 20, with the first aircraft cabin structure second edge 25 shown adjacent to a partition edge cap 27 (that can rest adjacent to another type of aircraft cabin assembly gap 18a) to form a partition second edge gap between the partition second edge 25 and the adjacent partition edge cap 27, with the partition second edge gap located at a partition second edge/partition edge cap interface 27a. In certain present aspects, for example, when a partition is configured to contact and otherwise extend up to another aircraft cabin structure that can be, for example, a ceiling surface 15a, or a storage bin surface 15c of a storage bin 15b, etc., partition edge cap may or may not be present. In addition, in certain present aspects, for example, when a partition is configured to contact and otherwise extend up to another aircraft cabin structure that can be, for example, a ceiling surface 15a, or a storage bin surface 15c of a storage bin 15b, etc., a second assembly gap can occur between a partition edge and a ceiling surface. (See FIG. 10).

The enumerated features shown in FIG. 3 are set forth and described to make clear useful and non-limiting positioning of the tubular seals of the present disclosure (e.g., into an aircraft cabin assembly 18 of the type shown in FIG. 3), for example, at least between adjacently positioned first and second aircraft cabin structures and at the first and second aircraft cabin structure "interfaces" that can contain a gap at such interfaces. That is, while the tubular seals of the present disclosure are not shown in FIG. 3, according to present aspects, the presently disclosed tubular seals are intended to fill gaps between aircraft cabin structures including at least those that are of the type shown in FIG. 3. In addition, according to present aspects, to facilitate aircraft cabin assembly installations, the present tubular seals can be removably affixed to aircraft cabin structures prior to installation of a structure and be a part of an aircraft structure rather than the tubular seals being separately inserted into a gap as a separate step in an assembly installation.

According to present aspects, the gaps that would otherwise exist at the partition first edge gap and partition second edge gap can be "sealed" by the presently disclosed elongated tubular seals. A partition first edge gap 23 (as shown at least in FIGS. 4, 5A, 5B, 5C, 6A, 6B, 7A, and 7B), and a partition second edge gap (shown in FIG. 10 as gap 72) represent non-limiting examples of locations in an aircraft cabin where the presently disclosed tubular seals can be incorporated with improved sealing attributes afforded the aircraft cabin assemblies, and aircraft incorporating the aircraft cabin assemblies, etc.

FIG. 4 shows a cross-sectional end view of the present tubular seal 30 formed as a bonded two-piece tubular seal 40 comprising a first open seal segment 32 joined to a second open seal segment 34. First open seal segment 32 comprises a first dimension (e.g., length, width, and height) and further comprises a first open seal segment arcuate middle region 32a bounded at one end by an arcuate middle region first end 32b having a first open seal segment inwardly extending first leg 32c. First open seal segment 32 further comprises a first open seal segment arcuate middle region 32a bounded at the other end by an arcuate middle region second end 32d having a first open seal segment inwardly extending second leg 32e.

As shown in FIG. 4, second open seal segment 34 comprises a second dimension (e.g., length, width, and height) and further comprises a second open seal segment arcuate middle region 34a bounded at one end by an arcuate middle region first end 34b having a second open seal segment inwardly extending first leg 34c. Second open seal segment 34 further comprises a second open seal segment arcuate middle region 34a bounded at the other end by an arcuate middle region second end 34d having a second open seal segment inwardly extending second leg 34e.

In a present example, the dimension of the first open seal segment 32 (first dimension) and the dimension of the second open seal segment 34 (second dimension) are substantially equivalent to one another. In another present example, the dimension of the first segment 32 (first dimension) and the dimension of the second segment 34 (second dimension) are identical to one another. When the first and second open seal segments 32, 34 are identical to one another, and upon bonding to one another, the first and second open seal segments are mirror images of one another about a vertical axis extending through the "bonding zones" occurring at the first and second open seal segment interfaces (with the vertical axis shown in FIG. 4 as a dotted line). That is, as shown in FIG. 4, the first open seal segment 32 is joined (e.g., permanently bonded) to the second open seal segment 34 at the first open seal segment first inwardly extending leg/second open seal segment first inwardly extending leg interface 36. The first open seal segment 32 is additionally joined (e.g., permanently bonded) to the second open seal segment 34 at the first open seal segment second inwardly extending leg/second open seal segment second inwardly extending leg interface 38. According to a present example, the first and second open seal segments are joined to one another only at the "bonding zones" occurring at the first and second open seal segment interfaces.

When joined, the two open seal segments form the present tubular seal 30 that comprises a joined two-piece tubular seal 40 comprising a joined two-piece tubular seal wall 42 (referred to equivalently as the tubular seal wall 42 having a wall thickness "t1" at least along the arcuate regions of the tubular seal, and further having a wall thickness "t2" at the "bonding zones" located at the first and second segment interfaces. In one present example, the thickness "t2" can be substantially equivalent to two-times (2×) the wall thickness "t1". The wall thickness "t1" is referred to equivalently herein as the joined two-piece aircraft cabin interior tubular seal wall thickness. Additionally, the present joined two-piece seal is equivalently referred to herein as the joined two-piece aircraft cabin interior tubular seal.

The tubular seal wall further comprises a joined two piece tubular seal wall first side 42a (shown in FIG. 4 and referred to equivalently herein as the "exterior surface" and the "joined two-piece tubular seal wall interior surface"), and a joined two piece tubular seal wall second side 42b (shown in FIG. 4 as and referred to equivalently herein as the "interior surface" and the "joined two-piece tubular seal wall interior surface"). The joined two piece tubular seal wall second side 42b comprises a joined two-piece tubular seal wall interior surface profile 44, with the joined two piece tubular seal wall second side 42b and the tubular seal wall interior surface profile 44 bounding tubular seal cavity 46. FIG. 4 further shows retaining element 50 attached to the tubular seal 30 at tubular seal base 31.

As stated herein, FIG. 4 further shows a dotted line representing a vertical axis extending vertically through the joined two-piece tubular seal. According to a present aspect, the first and second open seal segments 32, 34 are bonded together to form the present tubular seal, and wherein the first open seal segment and the second open seal segment are joined together to form symmetrical mirror images of one another about the vertical axis at the first open seal segment first inwardly extending linear leg/second open seal segment first inwardly extending linear leg interface and the first open seal segment second inwardly extending linear leg/second open seal segment second inwardly extending linear leg interface.

FIGS. 5A, 5B, and 5C show the present tubular seal engaged into a fixed position with an aircraft cabin structure edge. That is, as shown in FIGS. 5A, 5B, and 5C, the present tubular seal 30 that can be configured to seal gaps between adjacently positioned first and second aircraft cabin structures (e.g., in a closeout seal configuration) can comprise a permanently affixed tubular seal retaining element 50 (also shown in FIG. 4). In another present aspect shown in FIG. 5B, the tubular seal 30 can comprise an integral tubular seal retaining element 50.

When the retaining element is affixed to an area at the outer perimeter of the tubular seal 30, the retaining element 50, as shown at least in FIG. 5A, can be affixed to the tubular seal base 31 of the tubular seal 30. That is, retaining element 50 can comprise a retaining element base 50a that intimately contacts tubular seal 30 at the tubular seal base 31. Retaining element 50 further comprises a retaining element stem 50b that extends a selected distance from retaining element base 50a. Retaining element 50 further comprises retaining element projections 50c, 50d that extend in a lateral direction away from retaining element stem 50b, with corresponding retaining element grooves 51a and 51b bounded by the retaining element base 50a, the retaining element stem 50c, and retaining element projections 50c, 50d, respectively.

As shown in FIG. 5A, an aircraft cabin structure in the form of a partition 20 can comprise a retainer strip 52 positioned at and otherwise affixed to the partition edge 22a, and that can further be affixed to a second partition edge. Retainer strip 52 is configured to secure and otherwise removably attach the tubular seal to an aircraft cabin structure edge. In one present example, retainer strip 52 can be a discrete element. In one present example, retainer strip 52 can be configured to first attach to an aircraft structure edge, and the tubular seal can then securely engage the retainer strip. In another present example, the retainer strip 52 can be configured to first attach to the tubular seal, and the tubular seal comprising the attached retainer strip can securely and removably engage the aircraft structure (e.g., a partition edge, etc.) that can further comprise features to engage and hold securely fastening elements on the retainer strip.

According to a present aspect, the tubular seals are designed to uniformly engage an aircraft cabin structure, with the tubular seal configured to securely and removably engage an aircraft cabin structure edge, for example, to provide a resilient, reusable, and removable tubular closeout seal between adjacently positioned aircraft cabin structures. FIGS. 5A, 5B, and 5C illustrate a present example, where a retainer strip 52 engages with a tubular seal retaining element 50 and retainer strip 52 further engages with an aircraft cabin structure edge (e.g., a partition edge, etc.), As shown in FIG. 5A, retainer strip 52 comprises retainer strip prongs 53a, 53b extending from retainer strip first side 52a that are dimensioned and otherwise configured to extend a selected distance into retaining element grooves 51a, 51b of the tubular seal retaining element 50, respectively, with the retainer strip prongs 53a, 53b configured to engage and retain in position tubular seal retaining element projections 50c, 50d, respectively. As further shown in FIG. 5A, retainer strip locking posts 54a, 54b are shown extending from retainer strip second side 52b of retainer strip 52, with retainer strip locking posts 54a, 54b configured to "lock" with partition edge locking posts 56a, 56b, respectively, of partition edge 22a of partition 20.

As shown in FIG. 5A, the engagement of the tubular seal to an aircraft cabin structure (e.g., a partition edge of a partition, etc.) is accomplished by removably joining the tubular seal 30 to the retainer strip 52 that, in turn, joins the tubular seal of the aircraft cabin structure. That is, according to present aspects, the tubular seal can be fixedly and removably positioned and retained in position through locking and positioning mechanisms found in the tubular seal, the retainer strip, and the aircraft cabin structure which act cooperatively to position and retain the tubular seal in a selected location between adjacent aircraft cabin structures that together can form an aircraft cabin assembly. As mentioned herein, the retainer strip 52 can be a discrete element and first be combined with the tubular seal; or the retainer strip can be a discrete element and first be combined with the aircraft structure edge. In addition, according to present aspects the retainer strip can be integral with the aircraft cabin structure and need not be a discrete element; and, in one present example, the retainer strip can be integral with the tubular seal and need not be a discrete element.

FIG. 5B is a partial perspective view of the engagement of the present tubular seal 30 in the form of the joined two-piece tubular seal 40 as shown in FIG. 5A, and with the tubular seal 30 fixedly and removably attached to the second aircraft cabin structure first edge 22 (shown in the form of a partition first edge), and engaged via the retainer strip 52 as disclosed herein; and with numbering of the denoted parts identical to the numbers presented in FIG. 5A. FIG. 5B further shows a presently disclosed arrangement, according to a present example, between the retaining element and the tubular seal, where the retaining element 50 is integrated within (e.g., integral with) the tubular seal and the retaining element base 50*a* and is incorporated within the tubular seal base 31 of the tubular seal 30. In one present example, the retaining element can be a discrete element that is inserted into the tubular seal base.

FIG. 5C is a partial perspective view of the engagement of the present tubular seal 30 in the form of the joined two-piece tubular seal 40 as shown in FIG. 5A, and with the tubular seal 30 fixedly and removably attached to the second aircraft cabin structure first edge 22 (shown in the form of a partition first edge), and engaged via the retainer strip 52 as disclosed herein; and with numbering of the denoted parts as presented in FIG. 5A. FIG. 5C illustrates a present example, where the retaining strip 52 engages tubular seal 30, and retainer strip engages the aircraft cabin structure 20 at the aircraft cabin structure edge 22.

Unlike the assembly shown in FIGS. 5A and 5B, in the assembly presented in FIG. 5C, and according to a present example, the retainer strip 52 can comprise retainer strip flanges 55 configured to engage the aircraft cabin structure edge 22 (e.g., that can be a partition first edge, etc.) at a retainer strip flange/partition interface 58, for example in a frictional fit or that can otherwise be affixed to the aircraft cabin structure edge 22. In this example, the retainer strip locking post(s) 54*a* need not be present and/or need not "interlock" with partition edge locking posts 56*a*,56*b* that may or may not be present and that need not be present or necessary to secure the retainer strip and the tubular seal into a fixed and removable orientation in an aircraft cabin assembly, as the retainer flanges alone can serve to retain the retainer strip in position against the partition edge.

FIGS. 6A and 6B illustrate the present tubular seal in a position that is incorporated into an aircraft cabin structure. FIG. 6A is a partial perspective view of the assembly of the type shown at least in FIG. 5A. FIG. 6A shows the tubular seal fixedly and removably located in intimate contact with the aircraft cabin structure 20 in the form of a partition that is referred to equivalently herein as the "second" aircraft cabin structure. FIG. 6A further shows a partition edge cap 27 in position along and substantially covering a partition second edge 25, referred to equivalently herein as a second aircraft cabin structure second edge 25.

FIG. 6B shows the second aircraft cabin structure 20 in the form of a partition positioned adjacent to a first aircraft cabin structure 17 in the form of an aircraft cabin sidewall, with tubular seal 30 now interposed between the first and second aircraft cabin structures 17, 20 and configured to form a closeout seal. The interposition of the tubular seal between the first and second aircraft cabin structures is shown in FIG. 6B, with the adjacently positioned aircraft cabin structures 17, 20 imposing a compressive force (e.g., a compressive inward force) on the tubular seal that has altered the dimension (e.g., the width and height) of the tubular seal from an initial tubular seal dimension where no compressive force is present (as shown in FIG. 6A) to a second referred to a second tubular seal dimension.

According to present aspects, the tubular seal is dimensioned, when interposed between adjacent aircraft cabin structures, to sustain at least some degree of compressive force in a condition of minimal inward compression on the seal that, according to a present aspect, can be considered to be the initial tubular seal dimension. That is, to perform as a closeout seal between adjacent structures, the tubular seal will intimately contact surfaces of the adjacent structures, as the tubular seal "fills the gap" existing between adjacent structures and exhibits a requisite outward force against the adjacent structures to serve as a closeout seal.

In one present example, in aircraft operation and during various flight phases, the actual dimension of a gap occurring between adjacent aircraft cabin structures in an aircraft cabin assembly aboard an aircraft may vary and otherwise change. For example, a gap between adjacent aircraft cabin structures can change from a minimum gap distance ranging from about 7 mm to about 13 mm up to a maximum gap distance of about 31 mm. That is, in one present example, and according to present aspects, a gap between adjacent aircraft cabin structures can range from about 7 mm to about 31 mm. According to present aspects, the present tubular seals can, in a reliable and repeated fashion: 1) expand outwardly to fill and/or completely occupy a widening gap as compressive forces on the tubular seal lessen; 2) compress to fill and/or completely occupy a diminishing gap as compressive forces on the tubular seal increase; and 3) re-expand to fill and/or completely occupy a widening gap as compressive forces on the tubular seal lessen, and/or abate, etc.

FIGS. 7A and 7B are partial views illustrating an aircraft cabin assembly comprising the present tubular seal interposed between adjacently positioned first aircraft cabin structure 17 (e.g., in the form of a sidewall) and a second aircraft cabin structure 20 (e.g., in the form of a partition). As shown in FIG. 7A, the tubular seal 30 is interposed between and in intimate contact with both a first and second aircraft cabin structure, and is configured to perform as a closeout seal, with the tubular seal sustaining an amount of inward compressive force on the tubular seal from one or more of the first and second aircraft cabin structures, and with the tubular seal exerting an amount of responsive outward force that is less than the inward compressive, resulting in a slight compressive deformation of the tubular seal from an initial tubular seal dimension to a slightly compressed dimension state or condition.

As shown in FIG. 7B, as aircraft cabin structures shift and/or "move" during flight phases, the gap between the first and second aircraft structures can increase and decrease as the adjacent structures move toward or away from one another slightly, resulting in a change in the gap dimension between the adjacently positioned aircraft cabin structures. As the adjacent first and second aircraft cabin structures move toward one another and as the gap between the adjacent structures (into which the tubular seal is positioned) decreases, compressive forces on the interposed tubular seal increase, and the tubular seal incurs an increasing inwardly compressive force that causes the tubular seal to incur a greater degree of compressive deformation in a more compressed deformation state or condition as compared to the slightly compressed deformation state (shown in FIG. 7A).

As shown in FIG. 7A, the joined two-piece tubular seal that is joined at the adjoining surfaces of the pair of the two joined "legs" occur at a location that is about 180 degrees across from one another along a plane at the width of the tubular seal. FIG. 7B shows a degree of inward compressive forces on the tubular seal forcing the two joined leg pairs to offset in an extremely compressed tubular seal state that can result in the "offsetting" of the two joined leg pairs out of the 180 degree plane (that exists in a non-compressed and slightly compressed state or condition).

Even in the extremely compressed state, the present tubular seal will not rupture or permanently crease, bulge, incur structural damage or otherwise fail, as the present tubular seal retains the resilience required to "spring back" with an outward force sufficient for the tubular seal to maintain contact with adjacent structure surface(s) as the compressive force decreases; and the tubular seal comprises a resilience in composition, structure, design that enables the tubular seal to regain and/or reattain the initial tubular seal dimension (e.g., the dimension of the tubular seal in the absence of compressive force(s)), in substantially real time.

FIG. 8 shows a partial view of a present aircraft cabin assembly 18 comprising the adjacently positioned first aircraft cabin structure 17 in the form of a sidewall and the second aircraft cabin structure 20 in the form of a partition, with an interposed tubular seal that is not visible. As shown in FIG. 8, a present tubular seal assembly can comprise a discrete molding 47 that cover or otherwise enclose the interposed tubular seal.

In addition, in a present aspect, an increased flexibility in material selection and material choice can be achieved by combining a tubular seal insert that is physically and geometrically dimensioned to be received within the tubular seal cavity within the tubular seal. According to present aspects, and as shown in FIG. 9, the presently disclosed tubular seal and the present aircraft cabin assemblies and aircraft cabin structures incorporating the present tubular seal of the type shown in the present FIGs. can further incorporate a reinforcing insert 60 that can be inserted longitudinally into the tubular seal cavity 46 of the tubular seal 30.

In one example, with respect to the reinforcing insert component of the presently disclosed tubular seals, compression set for a melamine reinforcing insert material can be described by ASTM D 3574 Test D at 50% Compression Grade 2. Compression Deflection ASTM D 3574 Test B1 at 60 Sec and 25% deflection, Grade 2: 45 lbs/50 sq in.

According to present aspects, the extent to which the reinforcing insert substantially completely fills the volume of the tubular seal cavity can depend on the selected degree of resiliency and robustness of the tubular seal and insert in combination, the selected degree of resiliency and robustness of the tubular seal and the insert independently, the material selected for the tubular seal, the material selected for the reinforcing insert, and other considerations. The reinforcing insert can be selected and implemented into the reinforcing insert construction to complement, fortify, and otherwise contribute to the robustness and resiliency of the overall tubular seal construction such that, as the tubular seal is impacted by compressive forces "inwardly" on the tubular seal (that are, for example, presented by the adjacent aircraft cabin structures between which the tubular seal with reinforcing insert is interposed). The tubular seal with reinforcing insert can also deform from an initial cross-sectional configuration to a deformed or compressed cross-sectional configuration, and will deform to a selected degree of deformation.

According to present aspects, the degree of repeated resiliency of the reinforcing insert and the outward force provided by the reinforcing insert can be substantially equivalent to the outward force and resiliency of the tubular seal. That is, the reinforcing insert can be made from a material that can have a physical characteristic that can be further advantageously enhanced by shaping the reinforcing insert into a selected structurally advantageous geometry and that can be longitudinally and cross-sectionally dimensioned to be received within the tubular seal cavity. In one example, the reinforcing insert can comprise a foam material that can be an open or closed cell material including, for example, a melamine foam.

The presently disclosed tubular seals can be installed into locations within an aircraft cabin and in conjunction with, and as an integrated part of, aircraft cabin assemblies other than the partition/outboard wall (e.g., sidewall) interface location as shown in the present FIGs. As a non-limiting example of additional aircraft cabin assemblies and aircraft cabin structures within an aircraft that can be improved by incorporating the presently disclosed tubular seals, FIG. 10 shows an aircraft cabin assembly 70 (that can be an aircraft cabin assembly 18 in an aircraft of the type shown at least in the FIGs) comprising a first aircraft cabin structure in the form of a sidewall 17, a second aircraft cabin structure in the form of a partition 20, and further comprising an additional aircraft cabin structure in the form of an aircraft cabin ceiling 15, with the three aircraft cabin structures positioned adjacently to one another, with two adjacently positioned aircraft cabin structures (the partition and the ceiling) defining a gap 72 existing between the partition 20 and the ceiling surface 15*a* of ceiling 15.

As shown in FIG. 10, an aircraft cabin structure 70 in the form of an aircraft cabin assembly 70 is shown with an aircraft cabin ceiling surface 15*a* of an aircraft ceiling 15 and an aircraft cabin sidewall positioned adjacent to an aircraft cabin structure in the form of a partition 20. In this aspect, the so-called "first" aircraft cabin structure 17 (the sidewall) is positioned adjacent two "second" aircraft cabin structures (the ceiling and the partition) with gaps occurring at the sidewall/partition interface and at the ceiling/partition interface.

As shown in FIG. 10, a tubular seal 30 is shown in position interposed in the gap 23 at the sidewall/partition interface and another tubular seal 30 is shown in position at the gap 72*a* at the ceiling/partition interface. That is, a present tubular seal 30 is shown in position between aircraft cabin outboard wall 17 and partition 20 that is positioned adjacently and perpendicularly to partition 20, with aircraft cabin sidewall (e.g., outboard wall) 17 and partition 20 defining a gap 23 between aircraft cabin outboard wall 17 and partition 20. Two further present tubular seals 30 are shown filling a gap 72 between ceiling surface 15*a* of ceiling 15 and partition 20.

Incorporating the presently disclosed tubular seal into the manufacture of aircraft cabin assemblies and structures, and aircraft comprising such assemblies and structures, results in a significant and highly advantageous savings of resources in terms of at least: minimization of total parts used in the fabrication of aircraft and aircraft assemblies, manufacturing and inspection manpower hour reduction, overall assembly, structure, and aircraft cost reduction, part inventory design consistency increase, part standardization efficiency increase, part inventory reduction, manufacturing completion time reduction, the potential for overall aircraft weight reduction due at least to fewer total parts (and supporting fasteners, etc.), rework efficiency increase, etc.

The tubular seal disclosed herein provides gap-filling capabilities between first and second (and or third) aircraft cabin structures having gaps therebetween that are significantly superior to gap-filling capabilities of seals typically used and installed in aircraft cabin assemblies. Such enhanced capabilities include, but are not limited to, superior light-blocking abilities, useful life of the seals themselves, structural integrity of the cabin assemblies (e.g., through the elimination of rattles, etc., due to vibrations, etc.), improved life of the seals and improved life of the sealed aircraft components/assemblies/structures that are positioned adjacent to the tubular seals. The enhanced sealing afforded aircraft cabin assemblies and structures by the present tubular seal is achieved, at least in part, due to the robustness and resiliency of the present tubular seal (to maintain an outward force during the lifetime of the tubular seal) and the ability of the tubular seal to self-adjust inwardly or outwardly, in real time, to better fill gaps (between aircraft cabin structures) that can change continually or sporadically in their gap dimension during the useful lifetime of an aircraft and during various aircraft flight phases (e.g., takeoff, landing, pressurization, de-pressurization, etc.) of repeated flights.

As with material selection for components and assemblies used in aircraft, weight and cost are factors that can impact a component's usefulness on an aircraft. Further present aspects are directed to cost and weight considerations for the manufacture of the presently disclosed tubular seals. Present aspects balance the need for material cost constraints, weight, etc., with the selected tubular seal performance, and present aspects contemplate a resilient polyurethane foam material comprising a molded density ranging from about 18 to about 22 lb/cu.ft., with a suitable tubular seal wall thickness "T1" ranging from about 0.1000 to about 0.1500 inches and having a tubular seal joined region wall thickness at the inwardly protruding tubular seal legs ranging from about 0.2000 to about 0.3000 inches. As stated herein, according to a present aspect, the present tubular seal that can be made from a polyurethane foam can comprise a compression force deflection at 50 percent ranging from about 20 to about 50 psi.

FIGS. 11, 12, and 13 are flowcharts generally describing methods according to present aspects. FIG. 11 outlines a method 100 for sealing a gap adjacent an aircraft cabin structure in an aircraft cabin of an aircraft, with the method including installing 102 a first aircraft cabin structure and installing 104 a second aircraft cabin structure into an aircraft cabin, with the second aircraft cabin structure positioned adjacent to and at a selected distance from a first aircraft cabin structure to form a first aircraft cabin structure/second aircraft cabin structure interface. Method 100 further includes interposing 106 a tubular seal of the type disclosed herein between the first and second aircraft cabin structures at the first aircraft cabin structure/second aircraft cabin structure interface. According to present aspects, at least one of the first aircraft cabin structure and second aircraft cabin structure can include the interposed tubular seal, with the tubular seal positioned at (and otherwise interposed between) the first aircraft cabin structure and the second aircraft cabin structure at the first aircraft cabin structure/second aircraft cabin structure interface to form a sealed aircraft cabin assembly.

The tubular seal comprises The tubular seal comprises a first open seal segment comprising a first open seal segment arcuate middle region comprising a first open seal segment arcuate middle region first end terminating at a first open seal segment first inwardly extending linear leg, and with the first open seal segment arcuate middle region second end terminating at a first open seal segment second inwardly extending linear leg, and with the first open seal segment comprising a first length, width, and height dimension. The aircraft cabin assembly tubular seal further comprises a second open seal segment comprising a second arcuate middle region comprising a second arcuate middle region first end terminating at a second open seal segment first inwardly extending linear leg, and with the second open seal segment arcuate middle region second end terminating at a second open seal segment second inwardly extending linear leg, and with the second open seal segment comprising a second length, width, and height dimension, and with the second length, width, and height dimension identically equivalent to the first length width and height dimension of the first open seal segment. The first open seal segment and said second open seal segment are joined together only at a first open seal segment first inwardly extending linear leg/second open seal segment first inwardly extending linear leg interface and at a first open seal segment second inwardly extending linear leg/second open seal segment second inwardly extending linear leg interface to form a joined two-piece tubular seal. The joined two-piece tubular seal comprises a joined two-piece tubular seal wall, said joined two-piece tubular seal wall defined by a joined two-piece tubular seal wall tubular seal wall first side and a joined two-piece tubular seal wall tubular seal wall second side, with the joined two-piece tubular seal wall tubular seal wall second side comprising a joined two-piece tubular seal wall interior surface profile, with the joined two-piece tubular seal wall interior surface profile defining a tubular seal cavity, and with the joined two-piece tubular seal wall further comprising a tubular seal wall thickness, and wherein the joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and the tubular seal further is configured to automatically expand outwardly from the tubular seal compressed condition to a tubular seal expanded condition in the absence of the inwardly compressive force, with the tubular seal expanded condition comprising a tubular seal expanded condition dimension substantially similar to the tubular seal initial dimension.

The tubular seal further includes a tubular seal retaining element. In another present aspect, the tubular seal retaining element integral with the tubular seal.

FIG. 12 outlines a method 200 for sealing a gap in an aircraft cabin of an aircraft adjacent an aircraft cabin structure in an aircraft cabin of an aircraft, with the method including the elements of method 100 including installing 102 a first aircraft cabin structure and installing 104 a second aircraft cabin structure into an aircraft cabin, with the second aircraft cabin structure adjacent to and at a selected distance from a first aircraft cabin structure to form a first aircraft cabin structure/second aircraft cabin structure interface. At least one of the first aircraft cabin structure and second aircraft cabin structure including a tubular seal, with the tubular seal positioned at the first aircraft cabin structure/second aircraft cabin structure interface. Method 200 further includes interposing 106 a tubular seal between the first and second aircraft cabin structures at the first aircraft cabin structure/second aircraft cabin structure interface, and further includes maintaining 108 within the tubular seal, an outward force opposing the compressive inward force imposed on the tubular seal by the adjacent first and second aircraft cabin structures.

FIG. 13 is a flowchart outlining a present method 300 that includes the elements of methods 100 (shown in FIG. 11) and method 200 (shown in FIG. 12), and further including forming 110 a closeout seal at the first aircraft cabin structure/second aircraft cabin structure interface.

The methods outlined in FIGS. 11, 12, and 13 are understood to incorporate the tubular seals, aircraft cabin assemblies comprising the tubular seals, and aircraft comprising the aircraft assemblies comprising the tubular seals of the type shown at least in FIGS. 1, 2, 3, 4, 5A, 5B, 5C, 6A, 6B, 7A, 7B, 8, 9 and 10.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide. The present tubular seal comprises an outward force that allows the tubular seal in a compressed state or condition to return to an re-expanded and non-compressed dimension state or condition (in the absence of an inward compressive force) that is substantially similar to, or nearly similar to, or very closely similar to, an initial tubular seal dimension.

The term "real time" as used herein connotes a small time duration ranging from about 0.1 to about 1.0 second in duration. That is, according to present aspects, the tubular seal The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An aircraft cabin assembly tubular seal comprising:
a polyurethane foam material, said tubular seal further comprising:
a first open seal segment comprising a first open seal segment arcuate middle region comprising a first arcuate middle region first end terminating at a first open seal segment first inwardly extending linear leg and a first open seal segment arcuate middle region second end terminating at a first open seal segment second inwardly extending linear leg, said first open seal segment comprising a first dimension;
a second open seal segment comprising a second open seal segment arcuate middle region comprising a second arcuate middle region first end terminating at a second open seal segment first inwardly extending linear leg and a second open seal segment arcuate middle region second end terminating at a second open seal segment second inwardly extending linear leg, said second open seal segment comprising a second dimension, said second dimension substantially equivalent to the first dimension of the first open seal segment, said first open seal segment and said second open seal segment bonded together only at the first open seal segment first inwardly extending linear leg and the second open seal segment first inwardly extending linear leg to form a first interface and at the first open seal segment second inwardly extending linear leg and the second open seal segment second inwardly extending linear leg to form a second interface to form a joined two-piece tubular seal for the aircraft cabin assembly tubular seal, said joined two-piece tubular seal comprising:
a joined two-piece tubular seal wall, said joined two-piece tubular seal wall comprising a joined two-piece tubular seal wall tubular seal wall first side and a joined two-piece tubular seal wall tubular seal wall second side, said joined two-piece tubular seal wall tubular seal wall second side comprising a joined two-piece tubular seal wall second side surface profile, said joined two-piece tubular seal wall second side surface profile defining a tubular seal cavity, said joined two-piece tubular seal wall further comprising a joined two-piece tubular seal wall thickness; and
wherein said joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, and said tubular seal further configured to automatically expand outwardly from the tubular seal compressed condition to a tubular seal expanded condition in the absence of the inwardly compressive force, said tubular seal expanded condition comprising a tubular seal expanded condition dimension substantially similar to the tubular seal initial dimension.

2. The aircraft cabin assembly tubular seal of claim 1, said first open seal segment and said second open seal segment joined together to form symmetrical mirror images of one another about a vertical axis extending through the first open seal segment first inwardly extending leg/second open seal segment first inwardly extending linear leg interface and the first open seal segment second inwardly extending leg/second open seal segment second inwardly extending linear leg interface.

3. The aircraft cabin assembly tubular seal of claim 1, wherein the joined two-piece tubular seal is a removable tubular seal.

4. The aircraft cabin assembly tubular seal of claim 2, wherein the first open seal segment first inwardly extending leg and the second open seal segment first inwardly extending linear leg at the first interface and the first open seal segment second inwardly extending leg and the second open seal segment second inwardly extending linear leg at the second interface comprise a bonding surface configured to join together the first open tubular seal segment and the second open tubular seal segment.

5. The aircraft cabin assembly tubular seal of claim 1, further comprising a tubular seal retaining element.

6. The aircraft cabin assembly tubular seal of claim 5, wherein the tubular seal retaining element is bonded to the joined two-piece tubular seal.

7. The aircraft cabin assembly tubular seal of claim 5, wherein the tubular seal retaining element is integral with the joined two-piece tubular seal.

8. The aircraft cabin assembly tubular seal of claim 5, wherein said tubular seal retaining element is configured to mate with a tubular seal retainer strip, said tubular seal retainer strip configured to receive the tubular seal retaining element.

9. The aircraft cabin assembly tubular seal claim 1, said joined two-piece tubular seal further comprising a reinforcing insert, said reinforcing insert dimensioned to fit longitudinally within the tubular seal cavity.

10. An aircraft cabin interior structure comprising the aircraft cabin assembly tubular seal of claim 1.

11. An aircraft comprising the aircraft cabin assembly tubular seal of claim 1.

12. An aircraft cabin assembly comprising;
a first aircraft cabin structure, said first aircraft cabin structure comprising a first aircraft cabin structure surface;
a second aircraft cabin structure comprising a second aircraft cabin structure edge, said second aircraft cabin structure edge positioned proximate to said first aircraft cabin structure surface, said aircraft cabin assembly comprising a gap defined by said first aircraft cabin structure surface and said second aircraft cabin structure edge, said second aircraft structure edge further comprising a tubular seal, said tubular seal comprising a polyurethane foam material, said tubular seal further comprising:

a first open seal segment comprising a first open seal segment arcuate middle region comprising a first arcuate middle region first end terminating at a first open seal segment first inwardly extending linear leg and a first open seal segment arcuate middle region second end terminating at a first open seal segment second inwardly extending linear leg, said first open seal segment comprising a first dimension;

a second open seal segment comprising a second open seal segment arcuate middle region comprising a second arcuate middle region first end terminating at a second open seal segment first inwardly extending linear leg and a second open seal segment arcuate middle region second end terminating at a second open seal segment second inwardly extending linear leg, said second open seal segment comprising a second dimension, said second dimension substantially equivalent to the first dimension of the first open seal segment, said first open seal segment and said second open seal segment bonded together only at the first open seal segment first inwardly extending linear leg and the second open seal segment first inwardly extending linear leg to form a first interface and at first open seal segment second inwardly extending linear leg and the second open seal segment second inwardly extending linear leg to form a second interface to form a joined two-piece tubular seal, said joined two-piece tubular seal comprising:

a joined two-piece tubular seal wall, said joined two-piece tubular seal wall defined by a joined two-piece tubular seal wall tubular seal wall exterior surface and a joined two-piece tubular seal wall tubular seal wall interior surface, said joined two-piece tubular seal wall tubular seal wall interior surface comprising a joined two-piece tubular seal wall interior surface profile, said joined two-piece tubular seal wall interior surface profile defining a tubular seal cavity, said joined two-piece tubular seal wall further comprising a joined two-piece tubular seal wall thickness;

wherein said tubular seal is fixedly attached to the second aircraft cabin structure edge of the second aircraft cabin structure, said tubular seal interposed between the first aircraft cabin structure surface of a first aircraft cabin structure and the second aircraft cabin structure edge; and wherein said joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, said tubular seal further configured to automatically expand outwardly from the tubular seal compressed condition to a tubular seal expanded condition in the absence of the inwardly compressive force, said tubular seal expanded condition comprising a tubular seal expanded condition dimension substantially similar to the tubular seal initial dimension.

13. The aircraft cabin assembly of claim 12, said first open tubular seal segment and the second open tubular seal segment joined together to form symmetrical mirror images of one another about a vertical axis extending through the first open seal segment first inwardly extending leg/second open seal segment first inwardly extending linear leg interface and the first open seal segment second inwardly extending leg/second open seal segment second inwardly extending linear leg interface.

14. The aircraft cabin assembly of claim 12, wherein the tubular seal is a closeout seal.

15. The aircraft cabin assembly of claim 12, wherein the first aircraft cabin structure is at least one of an aircraft cabin floor, an aircraft cabin ceiling, a storage bin, an aircraft cabin monument, an aircraft cabin wall, an aircraft cabin partition, and combinations thereof.

16. The aircraft cabin assembly of claim 12, wherein the second aircraft cabin structure is at least one of an aircraft cabin floor, an aircraft cabin ceiling, a storage bin, an aircraft cabin monument, an aircraft cabin wall, an aircraft cabin partition, and combinations thereof.

17. An aircraft comprising the aircraft cabin assembly of claim 12.

18. A method for sealing a gap adjacent an aircraft cabin structure, the method comprising:

installing a first aircraft cabin structure into an aircraft cabin;

installing a second aircraft cabin structure adjacent to a first aircraft cabin structure to form a first aircraft cabin structure/second aircraft cabin structure interface, at least one of said first aircraft cabin structure and said second aircraft cabin structure comprising a tubular seal, said tubular seal comprising a polyurethane foam material, said tubular seal fixedly attached to the second aircraft cabin structure, said tubular seal positioned at the first aircraft cabin structure/second aircraft cabin structure interface, said tubular seal comprising:

a first open seal segment comprising a first open seal segment arcuate middle region comprising a first arcuate middle region first end terminating at a first open seal segment first inwardly extending linear leg and a first open seal segment arcuate middle region second end terminating at a first open seal segment second inwardly extending linear leg, said first open seal segment comprising a first dimension;

a second open seal segment comprising a second open seal segment arcuate middle region comprising a second arcuate middle region first end terminating at a second open seal segment first inwardly extending linear leg and a second open seal segment arcuate middle region second end terminating at a second open seal segment second inwardly extending linear leg, said second open seal segment comprising a second dimension, said second dimension substantially equivalent to the first dimension of the first open seal segment, said first open seal segment and said second open seal segment bonded together only at the first open seal segment first inwardly extending linear leg and the second open seal segment first inwardly extending linear leg to form a first interface and at the first open seal segment second inwardly extending linear leg and the second open seal segment second inwardly extending linear leg to form a second interface to form a joined two-piece tubular seal, said joined two-piece tubular seal comprising:

a joined two-piece tubular seal wall, said joined two-piece tubular seal wall defined by a joined two-piece tubular seal wall tubular seal wall exterior surface and a joined two-piece tubular seal wall tubular seal wall interior surface, said joined two-piece tubular seal wall tubular seal wall interior surface comprising a joined two-piece tubular seal wall interior surface profile, said joined two-piece tubular seal wall interior surface profile defining a tubular seal cavity, said joined two-piece tubular seal wall further comprising a joined two-piece tubular seal wall thickness; and wherein said joined two-piece tubular seal is configured to dimensionally compress from a tubular seal initial dimension in the absence of a compressive force to a tubular seal compressed condition in the presence of an inwardly compressive force to form the aircraft cabin assembly tubular seal in the tubular seal compressed condition, said tubular seal further configured to automatically expand outwardly from the tubular seal compressed condition to a tubular seal expanded condition in the absence of the inwardly compressive force, said tubular seal expanded condition comprising a tubular seal expanded condition dimension substantially similar to the tubular seal initial dimension.

19. The method of claim 18, further comprising:

interposing said tubular seal between the first aircraft cabin structure and the second aircraft cabin structure.

20. The method of claim 18, further comprising:

forming a closeout seal at the first aircraft cabin structure/ second aircraft cabin structure interface; and maintaining an outward force in the tubular seal configured to oppose a compressive force on the tubular seal.

\* \* \* \* \*